(12) United States Patent
Morrison

(10) Patent No.: US 9,920,811 B1
(45) Date of Patent: Mar. 20, 2018

(54) MODULAR ISOLATING SYSTEM

(71) Applicant: D MORRISON CONSULTING INC., Markham (CA)

(72) Inventor: David Morrison, Markham (CA)

(73) Assignee: D Morrison Consulting Inc., Markham, Ontario (CA)

( * ) Notice: Subject to any disclaimer, the term of this patent is extended or adjusted under 35 U.S.C. 154(b) by 0 days.

(21) Appl. No.: 15/263,779

(22) Filed: Sep. 13, 2016

(51) Int. Cl.
  *F16M 13/00* (2006.01)
  *F16F 15/08* (2006.01)
  *F16F 3/087* (2006.01)

(52) U.S. Cl.
  CPC ............ *F16F 15/08* (2013.01); *F16F 3/0873* (2013.01); *F16F 2232/08* (2013.01)

(58) Field of Classification Search
  CPC ...... F16F 15/08; F16F 15/0275; F16F 3/0873; F16F 2232/08; F16F 1/3732; G10G 5/00
  USPC .......... 248/636, 560, 562, 638, 443; 108/91; 267/294
  See application file for complete search history.

(56) References Cited

U.S. PATENT DOCUMENTS

| | | | |
|---|---|---|---|
| 4,722,154 A | 2/1988 | Virta et al. | |
| 7,640,868 B2 * | 1/2010 | Morrison | F16F 15/08 108/91 |
| 8,215,245 B2 * | 7/2012 | Morrison | F16F 1/3732 108/91 |
| D741,840 S | 10/2015 | Morrison | |
| 2013/0206499 A1 | 8/2013 | Maruyama et al. | |

FOREIGN PATENT DOCUMENTS

JP    2014128000    7/2014

* cited by examiner

*Primary Examiner* — Todd M Epps
(74) *Attorney, Agent, or Firm* — Sand & Sebolt

(57) ABSTRACT

An isolating assembly, a modular isolating system including the assembly and a method of using the same. The system includes a plurality of individual isolating assemblies, each isolating assembly being engageable with an article; and wherein each isolating assembly includes a lower isolator that rests upon a flat surface; an upper isolator that is engageable with the article; and a connector having first and second ends. The first end of the connector engages the lower isolator and the second end of the connector engages the upper isolator. The upper isolator is positioned above the lower isolator and is movable relative to the lower isolator when vibration from the article is transferred to the upper isolator. The connector may be a polarizing connector that restricts the movement of the upper isolator in a first direction but permits movement thereof in a second direction that is orthogonal to the first direction.

26 Claims, 26 Drawing Sheets

MODULAR ISOLATING SYSTEM

BACKGROUND OF THE INVENTION

Technical Field

This invention relates generally to audio equipment. More particularly the invention relates to dampening vibration in audio equipment. Specifically, the invention is directed to an isolating assembly, a modular isolating system incorporating the assembly and a method of using the same; where the assembly includes an upper isolator engageable with the equipment, a lower isolator that engages a support surface; and a connector extending between the upper and lower isolators, where the connector permits the upper isolator to move relative to the lower isolator when vibrations are transferred to the upper isolator from the audio equipment.

Background Information

Audio equipment may generate substantial vibrations during operation or may be sensitive to vibrations in the supporting structure. These vibrations may transfer from the sound generating components to the housing of the equipment or may be affected by vibrations in the structure and support that affect performance and clarity. The vibrations may be of a sufficient magnitude to cause the housing to travel across a support surface upon which the housing rests. If the movement of the housing across the support surface is not halted, the housing may ultimately fall off the support surface and be damaged. In other instances, the vibration may not cause the housing of the audio equipment to move across a support surface. Instead, the vibration may be transferred to the support surface itself and can lead to the generation of unwanted sounds that may distort the quality of the sound from the audio equipment.

SUMMARY

There is therefore a need in the art for a device or system that will aid in reducing the level of vibration of a piece of audio equipment or that will reduce the tendency of the equipment to travel across a support surface when operating, or that will reduce the transfer of vibration from the audio equipment to the support surface upon which the equipment rests; or that will reduce the transfer of vibration to the audio equipment from the support surface.

An isolating assembly, a modular isolating system including the isolating assembly and a method of using the same to dampen vibration in a piece of equipment is disclosed herein. The assembly, system and method disclosed herein address some of the aforementioned issues. While this disclosure is directed mainly to audio equipment, it will be understood that the isolating assembly, system and method may be used in other fields of endeavor, such as in the reduction of vibrations in equipment like centrifuges, mixers or blenders. The terms "speaker", "amplifier", "turntable", "article" or "piece of equipment" used herein should be understood to encompass any piece of equipment that is sensitive to vibrations when operational and in which it is desirable to reduce vibration transfer between the equipment and support surfaces for the equipment or to or from other articles in contact with that equipment. Turntables, for example, a turntable are sensitive to external vibrations that may result in the unwanted vibrations being reproduced through the system or may result in a needle on the turntable skipping.

The system includes a plurality of individual isolating assemblies, each isolating assembly being engageable with the piece of equipment; and wherein each isolating assembly includes a lower isolator that rests upon a flat support surface; an upper isolator that is engageable with the piece of equipment; and a connector having first and second ends. The first end of the connector engages the lower isolator and the second end of the connector engages the upper isolator. The upper isolator is positioned above the lower isolator and is movable relative to the lower isolator when vibration from the piece of equipment is transferred to the upper isolator. The connector may be a polarizing connector that restricts the movement of the upper isolator in a first direction but permits movement thereof in a second direction that is orthogonal to the first direction. The second direction is aligned with the forces created by the speaker's transducers and the connector is constructed to respond to those forces.

The modular isolating system is designed to be installed at a factory that produces speakers. Alternatively, the isolating system may be installed by a user on an existing piece of equipment or a speaker and may be comprised of one or more separate or individual isolating assemblies. Two embodiments of isolating assembly are disclosed herein. The first embodiment of an isolating assembly disclosed herein is a polarizing or directional isolating assembly. This isolating assembly permits directional movement through the provision of an oval hole in the isolating rubber and a cooperating connector that polarizes motion. This isolating assembly permits vibrational movement in a backward-and-forward direction but restricts or limits side-to-side movement, or vice versa. The first embodiment isolating assembly may therefore be suitable for use with equipment such as speakers. The second embodiment of the isolating assembly disclosed herein is an omni-directional or non-directional isolating assembly and may therefore be suitable for use with equipment such as a turntable, amplifier, or other audio equipment.

The isolating assemblies disclosed herein may or may not form part of a frame; where, if provided, the frame is a unitary device and may include a polarizing hole for an isolating assembly such as an oval-holed isolating assembly. The presently disclosed system may be modular and be free of a frame to maintain polarity of the isolating assemblies themselves; so the factory or the end-user may need a way to position all of the isolating assemblies in such a manner that they will move in unison. The omni-directional (or non-directional or non-polarizing) isolating assemblies do not include this polarizing feature.

The isolating assemblies disclosed herein may not have a bottom frame. Instead, the isolating assemblies may be attached or hung from a bottom wall of the piece of equipment with which they are engaged. The lower part of the isolating assembly may sit on a support surface, such as a floor, and the lower isolating assembly's hole may be of an oval shape. The connector that connects the upper and lower isolating assemblies may be oval in cross-sectional shape. The oval shape tends to help create and maintain polarity. A visual direction indicator may be provided in any suitable location on the isolating assembly and indicates a particular direction. The visual direction indicators of several individual isolating assemblies may be aligned and this results in the polarizing components in the isolating assemblies tending to be aligned with each other. The isolating assemblies will all then tend to polarize motion transferred to them in much the same manner. The visual direction indicator makes it easy for an end-user to correctly orient all of the isolating assemblies used in the modular isolating system with each other.

The disclosed isolating assemblies may be frameless. The soft rubber of the isolating assembly may expand as the device is used for a period of time and therefore may loosen its grip on the captured polarized connector. The isolating assembly may therefore be provided with a rigid ring, preferably a metal ring that may be snapped into a groove on an exterior surface of the rubber components of the device. This metal ring may help the rubber to keep its shape and retain its engagement with the flanged connector.

In other embodiments, a bolt may be utilized to attach the isolating assembly to a bottom wall of the piece of equipment with which the isolating assembly is engaged. There may also be a movable lock nut that aids in compensating for uneven surfaces or aids in tilting the piece of equipment at an angle.

In one aspect, the invention may provide an isolating assembly for use with a piece of equipment that vibrates, said isolating assembly comprising a lower isolator adapted to rest upon a flat surface; an upper isolator adapted to be engaged with the piece of equipment; and a connector having first and second ends; wherein the first end engages the lower isolator and the second end engages the upper isolator; and upper isolator is positioned above the lower isolator.

In another aspect, the invention may provide a system for dampening vibration in a piece of equipment; said system comprising a plurality of individual isolating assemblies, each isolating assembly being adapted to engage the piece of equipment; and wherein each isolating assembly comprises a lower isolator; an upper isolator; and a connector having first and second ends; wherein the first end engages the lower isolator and the second end engages the upper isolator; and wherein upper isolator is positioned above the lower isolator and is movable relative to the lower isolator.

In another aspect, the invention may provide a method of dampening vibration in a piece of equipment comprising providing an isolator system that is positionable between a bottom wall of the piece of equipment and a flat surface; wherein the isolator system comprises a plurality of individual isolating assemblies, each isolating assembly comprising a lower isolator, an upper isolator and a connector having first and second ends; wherein the first end engages the lower isolator and the second end engages the upper isolator; and the upper isolator is positioned above the lower isolator and is movable relative to the lower isolator; engaging the upper isolator with the bottom wall of the piece of equipment; placing the lower isolator on the flat surface; and retaining the piece of equipment a distance above the flat surface.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
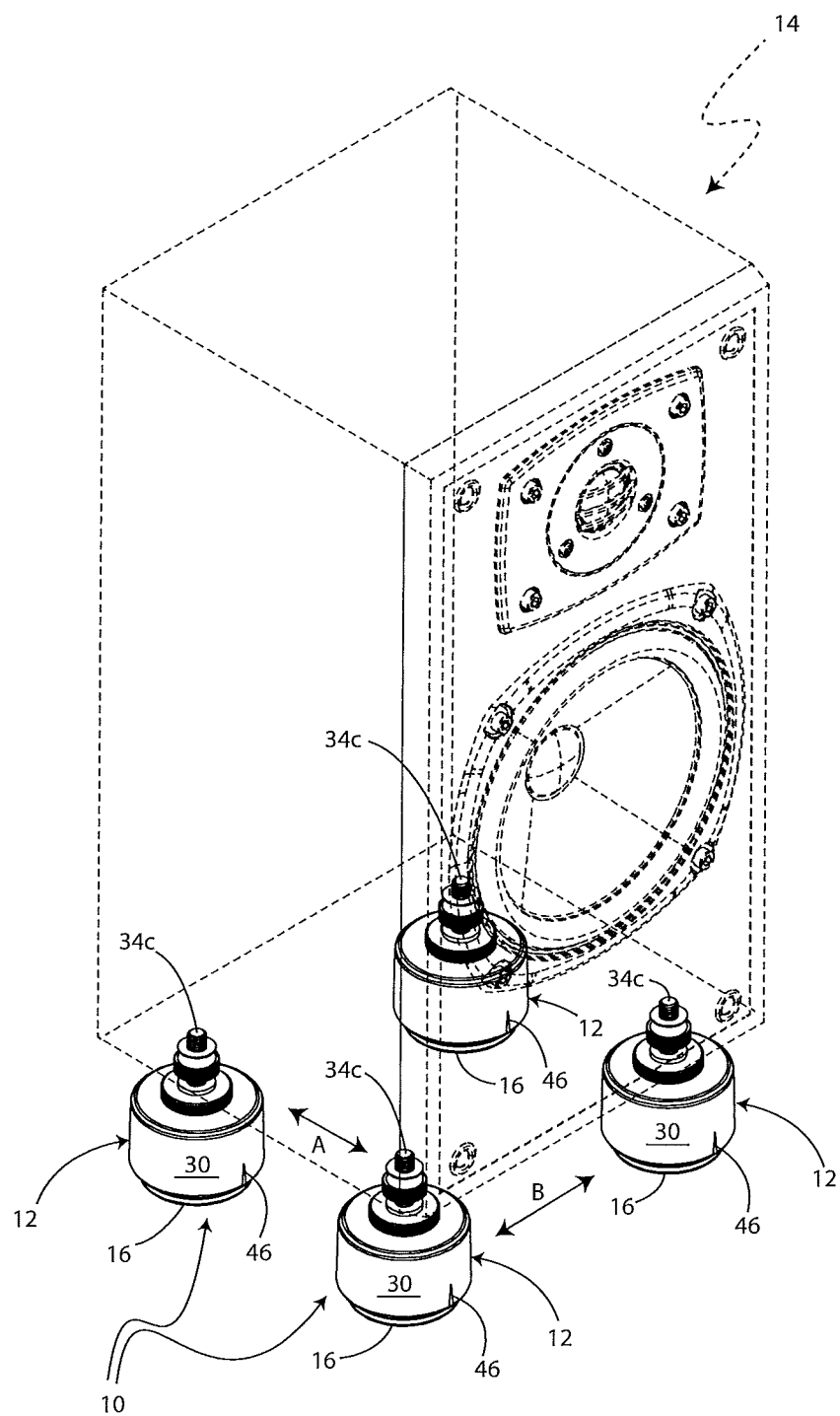
FIG. 1 is a perspective view of the modular isolator system in accordance with an aspect of the invention shown engaged with a speaker, where the speaker is shown in phantom.
Figure 2:
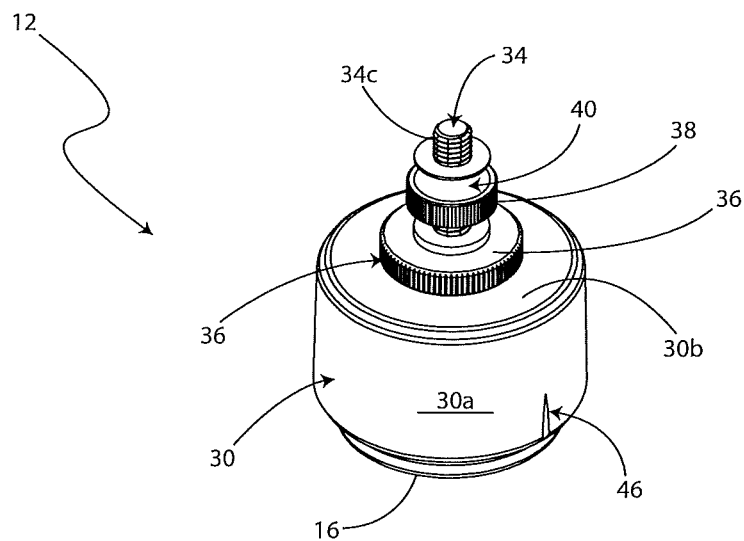
FIG. 2 is a top perspective view of a single isolator that is used in the system of FIG. 1.
Figure 3:
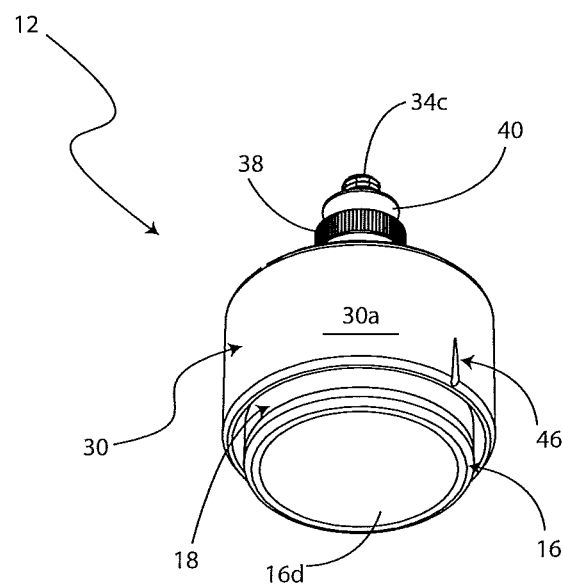
FIG. 3 is a bottom perspective view of the single isolator of FIG. 2.
Figure 4:
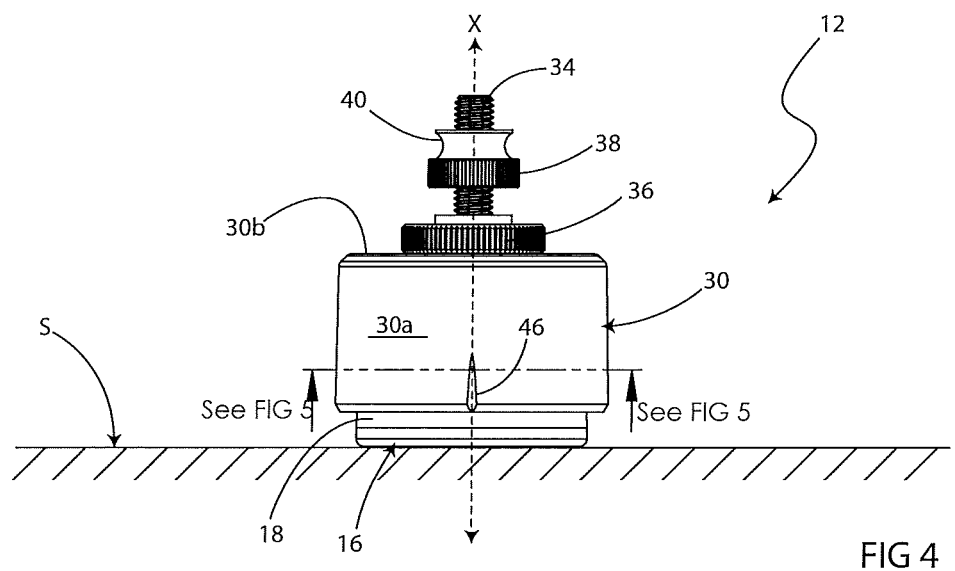
FIG. 4 is a front elevation view of the single isolator of FIG. 2.

Referring to FIGS. 1-28, there are shown a number of different embodiments of a modular isolating system for damping vibration.

FIGS. 1-9 show a first embodiment of a modular isolating system generally indicated at 10. Isolating system 10 comprises a plurality of a first embodiment of an individual isolating assembly, generally indicated at 12. Isolating assemblies 12 are referred to herein as "directional isolating assemblies" and will be described in greater detail hereafter.

FIGS. 10-15 show a second embodiment of a modular isolating system generally indicated at 110. Isolating system 110 comprises a plurality of a second embodiment of an individual isolating assembly, generally indicated at 112. Isolating assemblies 112 are referred to herein as "non-directional isolating assemblies" or "omni-directional isolating assemblies" and will be described in greater detail hereafter.

FIGS. 16-20 show a third embodiment of an isolating assembly 212 that may be utilized as part of a modular isolating system. Isolating assembly 212 may be referred to herein as a "polarizing puck" and will be described hereafter in greater detail.

FIGS. 21-25 show a fourth embodiment of an isolating assembly 312 that may be utilized as part of a modular isolating system. Isolating assembly 312 will be described hereafter in greater detail.

FIGS. 26-30 show a fifth embodiment of an isolating assembly 412 that may be utilized as part of a modular isolating system. Isolating assembly 412 will be described hereafter in greater detail.

Referring to FIGS. 1-9 there is shown the first embodiment of modular isolating system 10 that may be used to directionally dampen vibration. System 10 may be used in conjunction with a piece of equipment such as a speaker 14 (which is shown in phantom in FIG. 1). System 10 comprises a plurality of separate, individual isolating assemblies 12 that each engage part of speaker 14. FIG. 1 shows that four individual isolating assemblies 12 are utilized in system 10 but it will be understood that more than four isolating assemblies 12 may be used to dampen vibration of a piece of equipment such as speaker 14 or less than four isolating assemblies 12 may be used for this purpose. Isolating assemblies 12 work in unison with each other to dampen vibration in a polarized fashion. What is meant by this is that isolating assemblies 12 are oriented so that they may permit vibration of speaker 14 in a back-to-front direction (as indicated by arrow "A" in FIG. 1) but may tend to restrict or prevent vibration (i.e. dampen vibration) in a side-to-side direction (as indicated by arrow "B" in FIG. 1).

Figure 9:
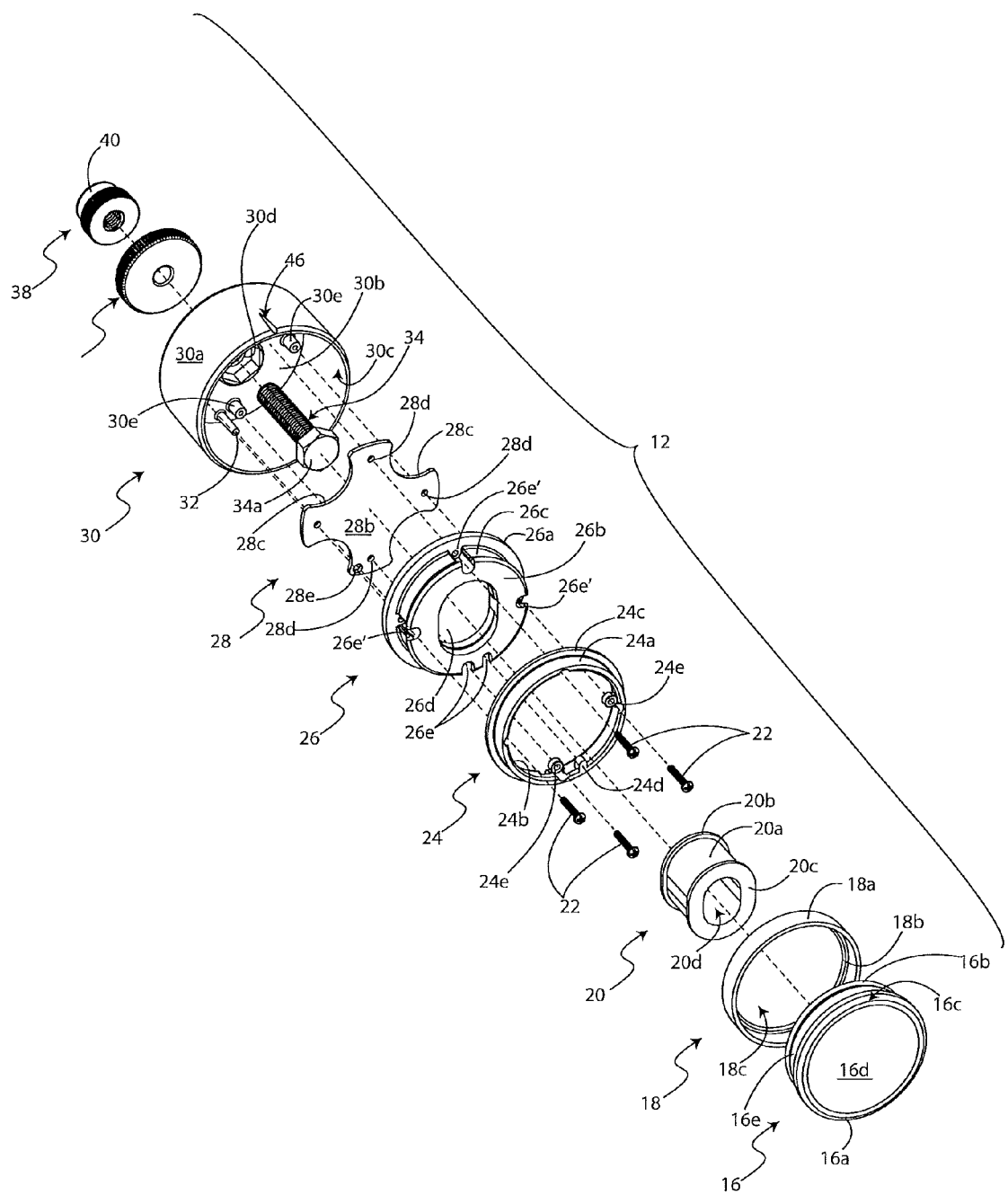
FIG. 9 is an exploded view of a single isolator shown in FIG. 2.
Figure 10:
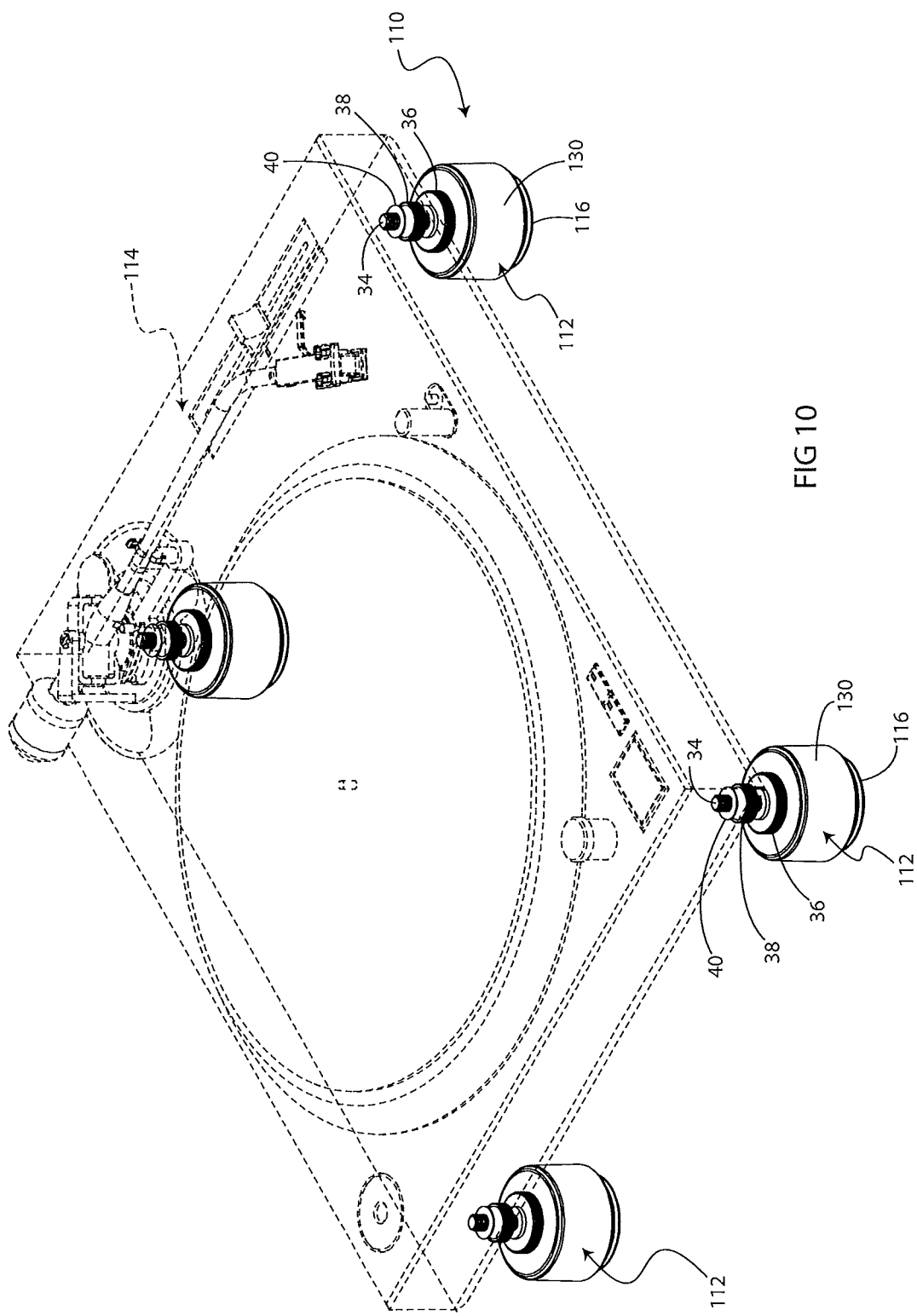
FIG. 10 is a top perspective view of the modular isolator system shown engaged with a turntable; where the turntable is shown in phantom.
Figure 11:
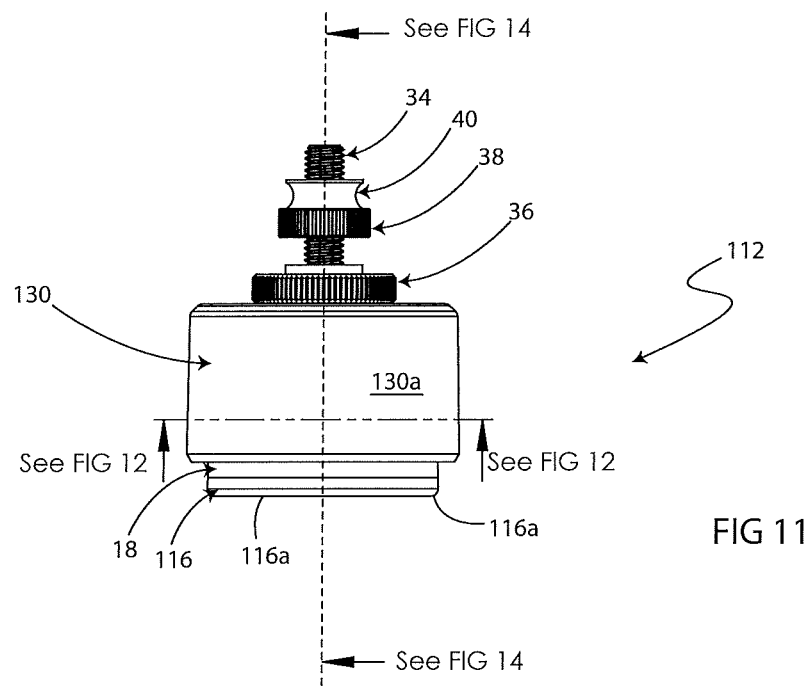
FIG. 11 is a front elevation view of a single isolator used in the system shown in FIG. 10.

FIG. 9 shows an exploded bottom perspective view of the components that make up one of the separate, individual isolating assemblies 12. Isolating assembly 12 includes a lower isolator 16, a ring 18, a flanged oval connector 20, a plurality of fasteners 22, a collar 24, an upper isolator 26, a plate 28, a shell 30, a pin 32, a mounting bolt 34, a lock washer 36, a lock nut 38 and washer 40. Lock washer 36 and lock nut 38 include knurling to make them easier for a user to grasp and rotate. Lock nut 38 is rotatable in a first direction to move nut 38 toward washer 36 or in a second direction to move nut 38 away from washer 36 during installation of isolating assembly 12 or removal thereof.

Lower isolator 16 and upper isolator 26 may fabricated from any suitable resilient or shock absorbent material. One such suitable material is rubber. Ring 18, connector 20, collar 24, plate 28 and shell 30 may be fabricated from a more rigid material, or a less resilient material, such as metal.

Figure 8:
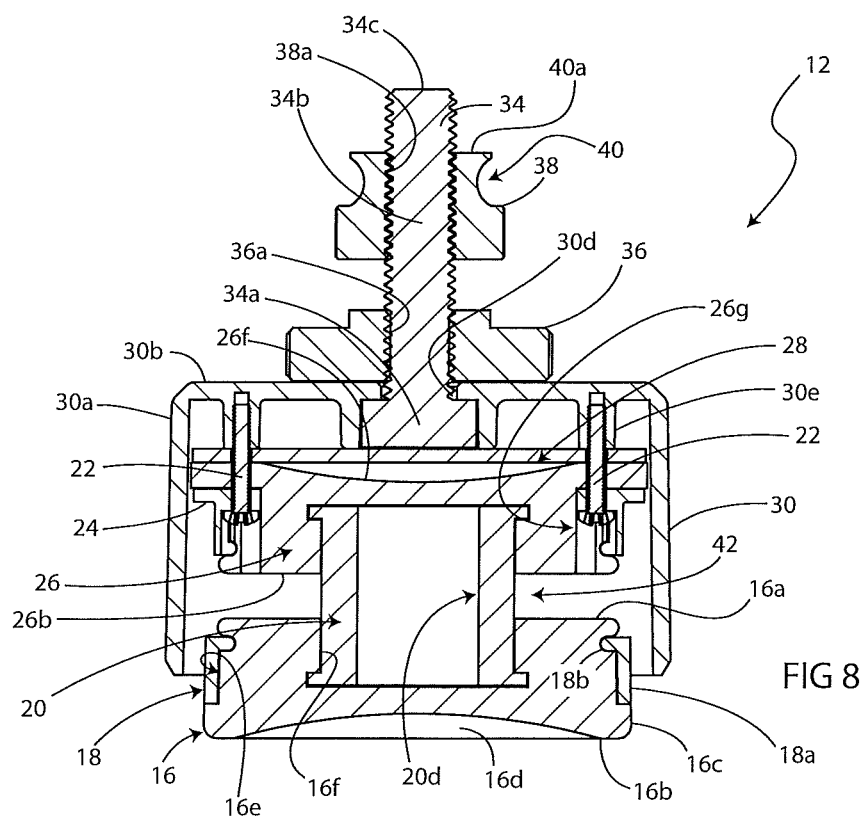
FIG. 8 is a cross-section of the isolator taken along line 8-8 of FIG. 7.

Referring still to FIG. 9, lower isolator 16 has an upper surface 16a (FIG. 8), a lower surface 16b and a circumferential side surface 16c. A depression 16d (FIG. 8) may be formed in lower surface 16b. One of more annular grooves 16e (FIG. 9) may be defined in circumferential side surface 16c. Grooves 16e are provided so that annular ring 18 may be engaged with lower isolator 16 as will be described below. An aperture 16f (FIG. 8) is defined in upper surface 16a of lower isolator 16 and aperture 16f extends for a distance downwardly toward lower surface 16b. Ring 18 may include an annular side wall 18a that is of a complementary shape and size to the portion of lower isolator 16 that defines groove 16e. An annular flange 18b extends inwardly from an upper end of side wall 18b. Flange 18b bounds and defines a central aperture 18c therein. Central aperture 18c may be generally circular in shape. Ring 18 is seated around the portion of lower isolator 16 that defines groove 16e and a region of upper surface 16a of lower isolator 16 extends through central aperture 18c as can be seen in FIG. 8.

Connector 20 includes a peripheral wall 20a, a top wall 20b and a bottom wall 20c. Peripheral wall 20a bounds and defines a bore 20d therethrough and bore 20d terminates in an opening in each of the top and bottom walls 20b, 20c. Top wall 20b and bottom wall 20c both extend for a distance laterally outwardly beyond the exterior surface of peripheral wall 20a. This flanged configuration better aids in securing connector 20 to each of the upper and lower isolators in isolating assembly 12. The flanged configuration of connector 20 can be readily seen in FIG. 8. It should be noted that peripheral wall 20a of connector 20 may be of a substantially constant dimension along its entire length from top wall 20b to bottom wall 20c.

Connector 20 may be generally oval in cross-section when viewed from either of the top end or the bottom end. Furthermore, the bore 20d defined in connector 20 may be generally oval in cross-sectional shape when viewed from either of the top or bottom ends. Connector 20 may be hollow or solid in constructions. Connector 20 is seated within aperture 16f of lower isolator 16 such that connector 20 is tightly retained within aperture 16f and a section of connector 20 extends outwardly for a distance beyond upper surface 16a.

Collar 24 includes an annular side wall 24a that bounds and defines a central opening 24b. As shown in FIG. 9, central opening 24b may be generally circular in shape. An upper wall 24c is provided at an upper end of side wall 24a. Upper wall extends laterally outwardly for a distance beyond an exterior surface of side wall 24a. As best seen in FIG. 9, collar 24 also includes at least one detent 24d that extends inwardly into central opening 24b from an interior surface of side wall 24a. A plurality of projections 24e extends inwardly into central opening 24b from an interior surface of side wall 24a. Each projection 24e defines a hole therein and through which one of the fasteners 22 will be inserted to join various components together (as will be later described herein).

Upper isolator 26 includes a top surface 26a, a bottom surface 26b, and a side surface 26c that extends between top and bottom walls 26a, 26b. Top surface 26a extends laterally outwardly for a distance beyond an exterior surface of side surface 26c. Side surface 26c bounds and defines a bore 26d that is accessible through openings in each of the top and bottom walls 26a, 26b. Bore 26d may be generally oval in shape when viewed from the underside of upper isolator 26. Connector 20 is pressed into oval bore 26d in upper isolator 26 and is in compression against the upper section of upper isolator 26.

A plurality of longitudinally extending slots 26e are defined in bottom surface 26b and side surface 26c of upper isolator 26. As illustrated in FIG. 9, a pair of adjacent slots 26e is defined in a first location on the circumference of bottom surface 26b and three additional single slots 26e' are defined at other locations around the circumference of bottom surface 26b. The slots 26e, 26' are located generally equidistantly from each other around the circumference of bottom surface 26b, with the slots 26e being located generally in the same region of the circumference. A hole (not numbered but shown in FIG. 9) is defined in the region of top surface 26a that overhangs each slot 26e, 26e' to receive a fastener 22 therethrough. FIG. 8 shows that top surface 26a of upper isolator 26 defines a depression 26f therein that may be similar in shape and size to depression 16d in lower isolator 16. Bottom surface 26b of upper isolator 26 defines an aperture 26g therein that mirrors aperture 16f in lower isolator 16. Aperture 26g is complementary in shape to an upper region of connector 20 that includes top wall 20d.

As illustrated in FIG. 8, collar 24 is engaged around an exterior surface of side surface 26c of upper isolator. Furthermore, upper and lower regions of connector 20 are each received in one of the apertures 26g, 16f of upper and lower isolators 26, 16, respectively. Connector 20 may be of a sufficient length to cause a gap 42 to be defined between upper surface 16a of lower isolator 16 and bottom surface 26b of upper isolator 26. In other words, bottom surface 26b of upper isolator 26 is spaced a distance away from upper surface 16a of lower isolator 16 by connector 20. Gap 42 helps ensure that upper isolator 26 is able to move relative to lower isolator 16 more easily. It will be understood that gap 42 may be quite minimal in nature so that upper and lower isolators 26, 16 are essentially touching each other but upper isolator 26 is still able to move back-and-forth relative to lower isolator 16.

Plate 28 may be a planar member that may be generally X-shaped when viewed from either of the top or bottom. As shown in FIG. 8, plate 28 has an upper surface 28a and a lower surface 28b. FIG. 9 shows plate 28 also defines a plurality of curved cut-out regions 28c in the exterior surface that extends between upper and lower surfaces 28a, 28b. A plurality of holes 28d is defined in plate 28; each hole 28d extending between upper and lower surfaces 28a, 28b. Holes 28d are each configured to receive one of fasteners 22 therethrough when lower surface 28b of plate 28 is positioned adjacent top surface 26a of upper isolator 26 and slots 26e, 26e' are aligned with holes 28d. Fasteners 22 are inserted through the aligned holes in collar 24, top isolator 26 and plate 28 in order to secure collar 24, top isolator 26, and plate 28 to shell 30. Plate 28 also defines an aperture 28e therein that extends between upper and lower surfaces 28a, 28b and may be positioned proximate one of holes 28d. The purpose of aperture 28e will be explained further below.

Shell 30 may comprise an engagement member that is adapted to engage the isolating assembly 10 with the piece of equipment. Shell 30 may comprise an annular or circumferential side wall 30a and a top wall 30b that bound and define a cavity 30c that is accessible through an opening defined at a lower end of shell 30 (where the opening to cavity 30c is located opposite top wall 30b. A central hole 30d may be defined in top wall 30b and hole 30d may be in communication with cavity 30c. Hole 30d may include a countersunk region that is defined in top wall 30b, where this countersunk region is hexagonally shaped to receive a head 34a of bolt 34 therein. The shaft 34b of bolt 34 is threaded and extends through hole 30d and for a distance outwardly beyond top wall 30b of shell 30 (as shown in FIG. 8). A plurality of tubular members 30e extends downwardly from an interior surface of top wall 30b of shell 30 and into cavity 30c thereof. Each tubular member 30e is positioned to be aligned with one of the slots 26e, 26e' defined in upper isolator 26 when isolating assembly 12 is assembled. Each tubular member 30e may define a threaded bore (shown but not numbered in FIG. 9). Each fastener 22 extends into the threaded bore of one of the tubular members 30e when isolating assembly 12 is assembled. Pin 32 extends downwardly from the interior surface of top wall 30b of shell and into cavity 30c thereof. Pin 32 is positioned and sized to be received through aperture 28e of plate 28 when the components of isolating assembly 12 are engaged and secured to each other. Pin 32 locates and positions parts 26 and 28 and maintains the alignment and polarity of the isolator system with respect to the outer housing as it can only be installed one way, i.e., with this locating pin 32.

When the components of isolating assembly 12 are engaged with each other, shaft 34b of bolt is inserted through hole 30d in top wall 30b of shell 30, through a threaded hole 36a in washer 36, and through a threaded hole 38a in washer 40. The head 34a of bolt 34 is seated in the countersunk portion of hole 30d in shell 30. Collar 24 is engaged around the recessed portion of side surface 26c of upper isolator 26 so that projections line up with slots 26e, 26e'. Plate 28 is then inserted into cavity 30c of shell 30 and upper isolator 26 is placed within cavity 30c, sandwiching plate 28 between upper isolator 26 and top wall 30b. It should be noted that plate 48 and upper isolator are positioned so that pin 32 on the interior of top wall 30b passes through aperture 28e of plate 28, through one of the holes (not numbered) in top surface 26a of upper isolator 26 and into one of slots 26e therein. The receipt of pin 32 in slot 26e brings the bores of projections 24e, slots 26e, 26e', the associated holes in top surface 26a, holes 28d in plate 28, and tubular members 30d into alignment. Fasteners 22 are then inserted through these aligned components and into the threaded bores of tubular members 30e. Fasteners 22 are rotated to secure collar 24, upper isolator 26, plate 28, and shell 30 together. An upper region of connector 20 is inserted into bore 26d of upper isolator 26. Ring 18 is engaged with lower isolator 16 and lower isolator is positioned in such a manner relative to shell 30 that a lower region of connector 20 is received in aperture 16f of lower isolator 16. As indicated earlier herein, a gap 42 is defined between upper and lower isolators 26, 16 so the only medium for transferring motion between upper and lower isolators is connector 20.

Figure 7:
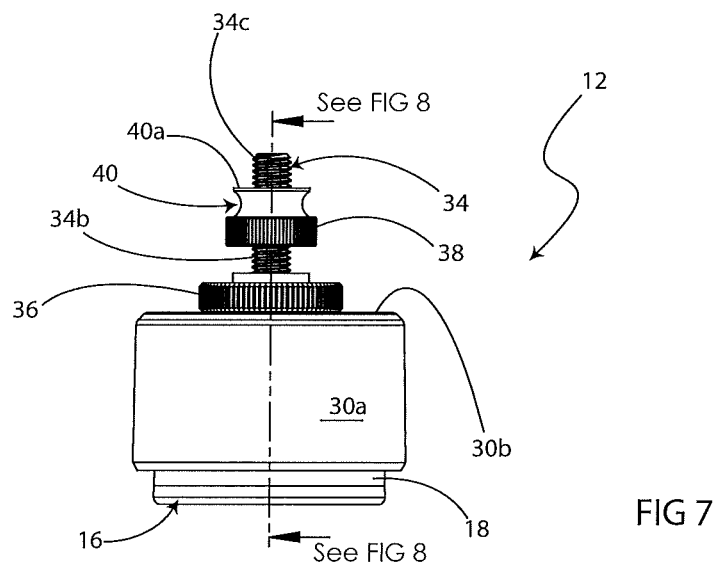
FIG. 7 is a front elevation view of the single isolator showing the pip flanges and bottom ring disposed around the rubber of the isolator.

FIGS. 7 and 8 show that a portion of shaft 34b of bolt 34 extends upwardly and outwardly through a hole 38a defined through washer 40 and outwardly fro a distance beyond an uppermost surface 40a of washer 40. This portion of shaft 34b is identified by the reference number 34c in FIG. 7. Portion 34c is threadably engaged with a threaded recess defined in one of a plurality of recess provided in a bottom wall of speaker 14. These threaded recesses are not shown in the accompanying figures. Isolating assembly 12 will be rotated in a first direction about an axis "X" (FIG. 4) to screw portion 34c of bolt 34 into engagement with one of the threaded inserts or parts provided on speaker 14. Isolating assembly 12 will be rotated in a second direction about axis "X" to disengage isolating assembly bolt 34 from speaker 14.

When isolating assemblies 12 are placed on a surface "S" (FIG. 4) to support speaker 14 thereon, the lower surface 16b of lower isolator 16 of each assembly 12 is placed on surface "S". The only connection between upper and lower isolators 26, 16 is connector 20. If speaker 14 vibrates during use, that motion is transferred to upper isolator 26 because of the threaded connection between speaker 14 and upper isolator 26 in the form of bolt 34. Any movement of upper isolator 26 relative to lower isolator 16 and how much vibration is damped or is passed on to lower isolator 16 is dictated by the interaction of upper isolator 26 with connector 20.

Figure 5:
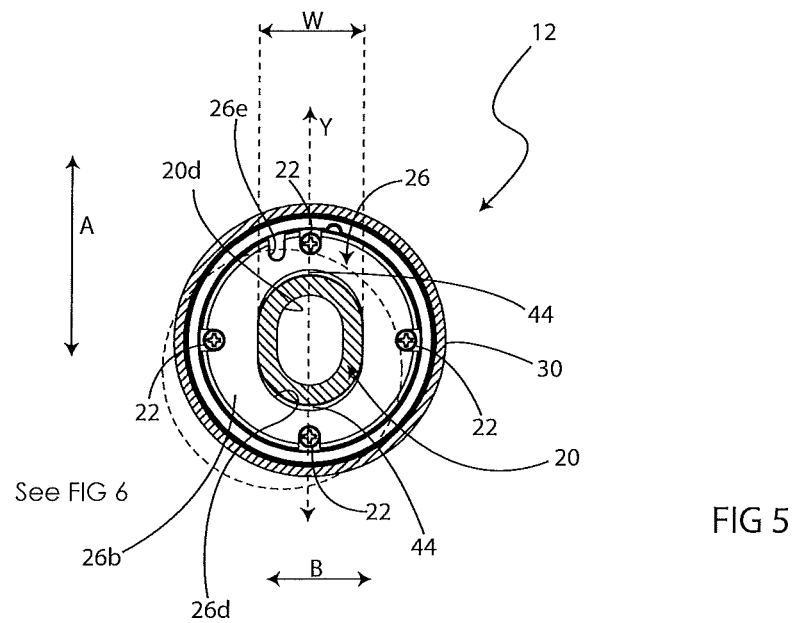
FIG. 5 is a cross-sectional view of the isolator of FIG. 2 taken through line 5-5 of FIG. 4.
Figure 6:
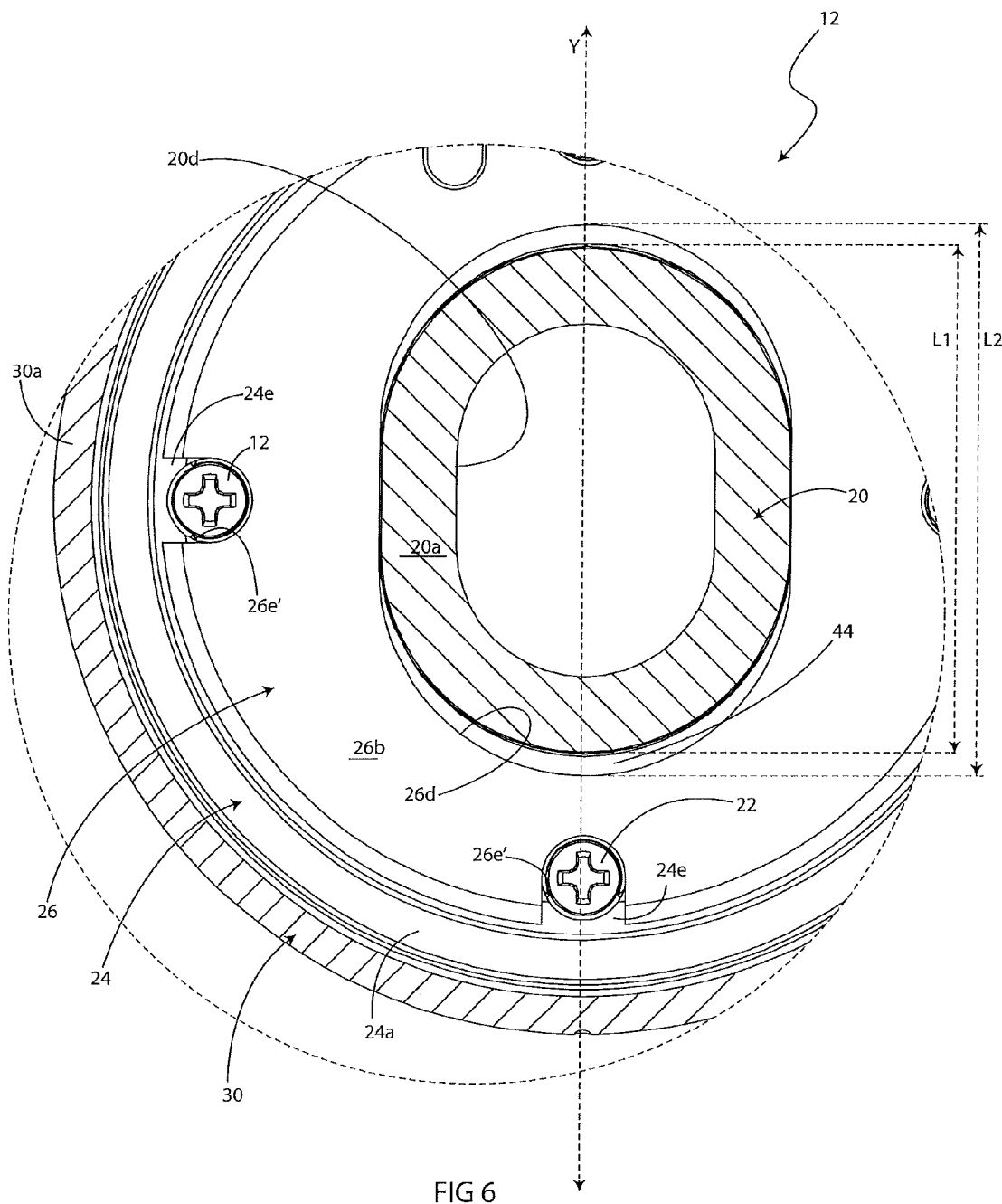
FIG. 6 is an enlarged view of the highlighted region of FIG. 5.

As best seen in FIGS. 5 and 6, connector 20 fits within bore 26d of upper isolator 26 and only a relatively small clearance gap 44 is defined between an exterior surface of connector 20 and the wall of upper isolator 26 that defines bore 26d. The engagement of pin 32 in aperture 28e of plate 28 and slot 26e of upper isolator 26 and the oval shapes of bore 26d and connector 20 ensure that a specific orientation between upper and lower isolators 26, 16 is maintained. FIGS. 5 and 6 also show that connector 20 and bore 26d are of substantially the same width "W" but that the length "L"1 of connector 20 is slightly smaller than the length "L2" of bore 26d. Upper isolator 26 is only able to vibrate with speaker 14 to the extent that the gap 44 between connector 20 and the wall that defines bore 26d permits. The relative dimensions ("W" and "L1"/"L2") of connector 20 and bore 26d help to ensure that vibration of speaker 14 and therefore upper isolator 26 in the directions indicated by arrow "B" (FIGS. 1 and 5) are substantially dampened, i.e., not passed on to lower isolator 16 and therefore to surface "S". On the other hand, the vibration of speaker 14 and therefore upper isolator 26 in the directions indicated by arrow "A" (FIGS. 1 and 5) may be transferred to lower isolator 16 and therefore to surface "S".

Vibration in the directions indicated by arrow "B" is substantially dampened because upper isolator 26 cannot move relative to connector 20 in the directions "B" because of the substantially equal width "W" of bore 26d and connector 20. This is because there is little to no gap between the width "W" of bore 26d and the width "W" of connector 20. Consequently, little to no motion in the directions of arrow "B" tends not to be transmitted from upper isolator 26 to lower isolator 16 through connector 20. Consequently, there is little to no motion in the directions of arrow "B" transferred from lower isolator 16 to surface "S".

The upper and lower isolators that are connected by connector 20 provides a high degree of isolation between upper housing 30 and bolt or stud 34 and the supporting surface, whether the assembly is polarized or not. Polarizing upper isolator 26 and lower isolator 16 is designed to resist movement, vibrations, or oscillations in any direction other than the primary of direction of the speaker's energy and greater resistance and right angles, greater clarity and focus is realized. The shell 30, bolt or stud 34 and speaker are directly connected.

The shape, thickness and durometer of the isolators is used to tune their performance for speakers in a range of weight. A number of different assemblies may be produced for a range of different speakers.

Figure 14:
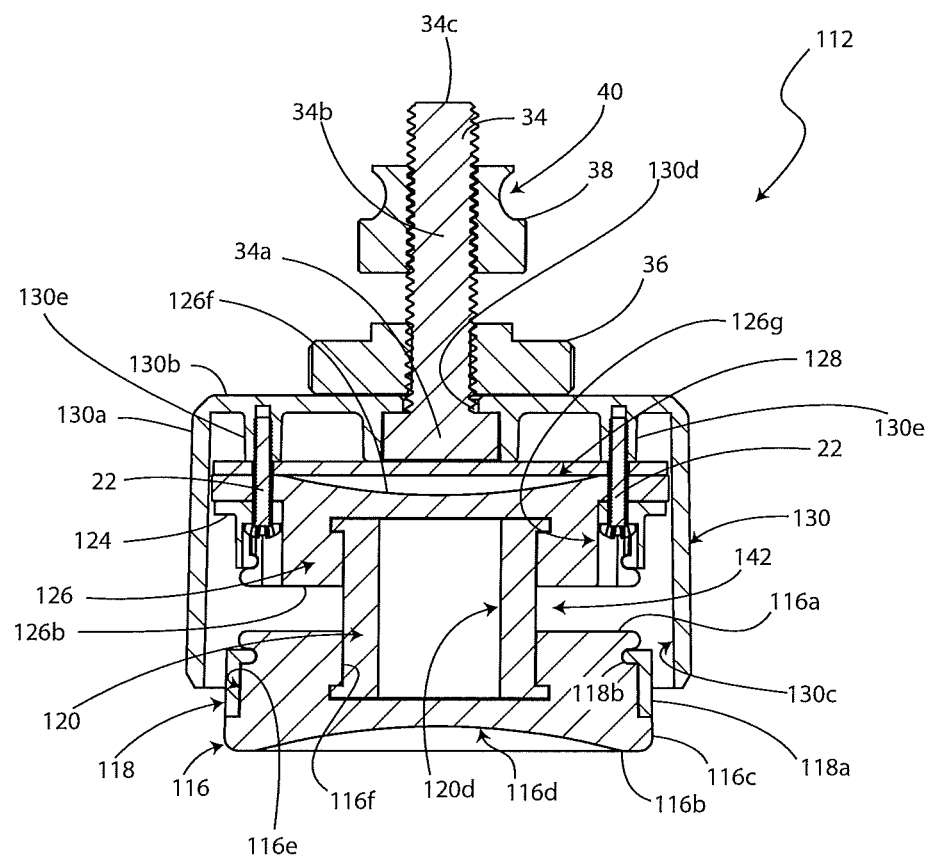
FIG. 14 is a cross-section of the isolator taken along line 14-14 of FIG. 11.

FIG. 14 shows the concave section 116d of lower isolator 16. This concave section 116d acts as a suction cup so that lower isolator 16 adheres to the supporting surface; it also provides a progressive rate of resistance to vertical loads in combination with the thickness and durometer of the section of connector 20. This occurs in both polarized and non-polarized assemblies.

In FIG. 14, the concave section 126f of upper isolator 126 provides a progressive rate of resistance to vertical loads in combination with the thickness and durometer of the section between plate 28 (or shell body) and connector 20. This occurs in both polarized and non-polarized assemblies.

The vibration of speaker 14 and therefore upper isolator 26 in the directions indicated by arrow "A" may be somewhat transferred to lower isolator 16 and thereby to surface "S" because of the relative dimensions of the length of bore 26d and the length of connector 20. Connector 20 has a length "L1" (FIG. 6) and bore 26d has a length "L2". Length "L1" is less than length "L2" and consequently a small gap 44 is defined between the wall defining bore 26d and the exterior surface of connector 20. Because of the present of gap 44, upper isolator 26 is able to move relative to connector 20 in the directions indicated by arrow "B" as these directions are substantially parallel to the lengths "L1" and "L2". In FIG. 6, the interference fit, thickness and durometer of the material along the sides of connector 20 provides more resistance than the interference fit, chamfered edge in "L1" and "L2" thicknesses and durometer along the length (front to back) of the upper and lower isolators. This occurs in the polarized assemblies.

When speaker vibrates in the directions indicated by arrow "B", that vibration is transferred from speaker 14 to upper isolator 26. The motion of upper isolator 26 in the directions indicated by arrow "B" s at least somewhat transferred to connector 20 and thereby to lower isolator 16 and thereby to surface "S". The intensity of vibration is at least somewhat absorbed by the resilient material of upper isolator 26 and any non-absorbed vibration energy may be transferred by connector 20 to lower isolator 16. The movement in upper isolator 26 generated by the vibration of speaker 14 may be polarized because of the cooperating oval shapes of the bore 26d and connector 20. The rigid ring 18, collar 24 and plate 28 (preferably fabricated from metal) provide strength to assembly 12. The ring 18 and collar 24 also limit lateral travel of the resilient upper and lower isolators 26, 16 and thereby aid in prolonging the useful life thereof.

FIGS. 1-4 show that an indicator 46 is provided on an exterior surface of isolating assembly 12. Indicator 46 may take any of a variety of forms including but not limited to the provision of a ridge or groove molded or cut into shell 30 or a surface marking such as printing or a decal that is applied thereto. Indicator 46 is positioned to align with a longitudinal axis "Y" (FIGS. 5 and 6) of connector 20 and bore 26d. This positioning is utilized when installing isolating assemblies 12 in speaker 14. The factory or the user/installer will rotate isolating assemblies 12 until all of their indicators 46 are oriented in a substantially identical fashion to each other. This orienting of indicators 46 on all of the isolating assemblies 12 in system 10 ensures that there is consistency in the directions ("A" or "B") that the isolating assemblies 12 dampen or permit vibration. The orienting of all isolating assemblies 12 in system 10 in a substantially identical manner is illustrated in FIG. 1.

System 10 is set up with isolating assemblies 12 positioned to permit back-to-front vibration (a first direction and a direction opposite to the first direction indicated by arrow "A") but dampen or restrict side-to-side vibration (a second direction and a direction opposite to the second direction indicated by arrow "B"). It should be noted that the first and second directions are orthogonally arranged, i.e., at right angles to each other. The resilient (rubber) lower and upper isolators 16, 26 are the components that absorb the shock of vibrations from the speaker 14 when operational. The isolating assembly 12 is configured so that the vibrations from speaker 14 will be transferred to upper isolator 26 which will then be caused to move in unison with speaker 14. The upper and lower isolating assemblies 26, 16 are connected by connector 20 and the connector 20 permits upper isolator 26 to move relative to lower isolator and for only some of the vibration of speaker 14 to be transferred from upper isolator 26 to lower isolator 16 and thereby to the surface "S" upon which lower isolator 16 rests.

The rigid, preferably metal, components of isolating assemblies 12 (i.e., the components other than upper and lower isolators 26, 16) ensure the assemblies 12 have sufficient strength to support the rubber components thereof (i.e., upper and lower isolators 26, 16) and permit those rubber components to absorb vibrations for a period of time without substantially loosening around connector 20 and thereby losing utility of the device.

Referring now to FIGS. 10-15, there is shown a second embodiment of a modular isolating system (or vibration damping system), generally indicated at 110, that comprises a plurality of second embodiment isolating assemblies 112 as above without polarized isolators, connector and assembly. These isolating assemblies 112 tend to dampen vibration non-directionally or omni-directionally. A high degree of isolation is provided but as there isn't a primary direction of forces such as with a speaker, no directionality or alignment is required through a full 360°. System 110 is suitable for use with a piece of equipment such as a turntable 114.

Isolating assemblies 112 include a number of components that are substantially identical in structure and function to the components of isolating assemblies 12 and therefore will not be described in further detail in this part of the disclosure. The substantially identical components in isolating assembly 112 are identified in FIGS. 10-15 by the same reference numbers as in the isolating assembly 12. The substantially identical components include ring 18, fasteners 22, plate 28, bolt 34, washer 36, nut 38, and washer 40. The lower isolator, connector, collar, upper isolator and shell differ from those used in the first embodiment. The lower isolator is indicated in FIGS. 10-15 by the reference number 116, the connector is indicated by the reference number 120, the collar is indicated by the reference number 124, the upper isolator is indicated by the reference number 126, and the shell is indicated by the reference number 130.

Figure 15:
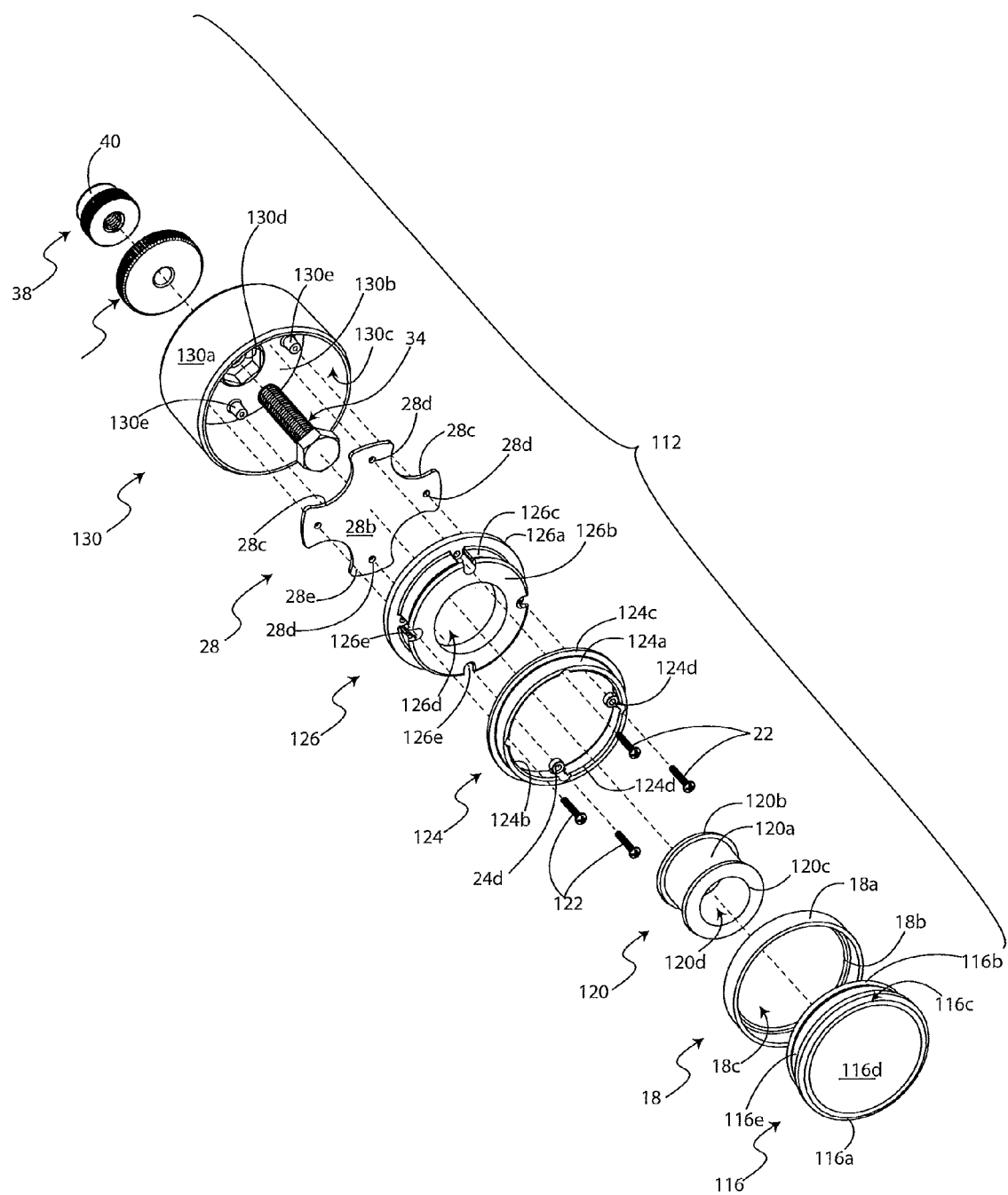
FIG. 15 is an exploded view of the single isolator shown in FIG. 10.

Referring still to FIGS. 14 and 15, lower isolator 116 has an upper surface 116a (FIG. 14), a lower surface 116b and a circumferential side surface 116c. A depression 116d may be formed in lower surface 116b. One of more annular grooves 116e (FIG. 15) may be defined in circumferential side surface 116c. Grooves 116e are provided so that annular ring 18 may be engaged with lower isolator 116 in the same manner that ring 18 engages lower isolator 16. An aperture 116f (FIG. 14) is defined in upper surface 116a and extends for a distance downwardly toward lower surface 116b. Aperture 116f is complementary in shape to bore 126d in upper isolator 126 and is configured to receive a portion of connector 120 therein.

Connector 120 is a non-polarizing or omnidirectional connector 120 where the cross-sectional shape and size of connector 120 is complementary to the shape and size of the bore 126d in upper isolator 126 and aperture 116f in lower isolator 116. This non-polarizing or omni-directional assembly 112 allows the upper isolator 126 to move back- and forth relative to lower isolator 116 in substantially any direction, i.e., at any angle through 360° in the same plane. In particular, the non-polarizing assembly 112 allows upper isolator 126 to move back-and-forth relative to the lower isolator 116 in a first direction and in a direction opposite to the first direction and also allows the upper isolator 126 to move back and forth in the same plane and relative to the lower isolator 116 in a second direction and in a direction opposite to the second direction; where the first direction and second direction are oriented at an angle to each other.

Peripheral wall 120a bounds and defines a bore 120d therethrough and bore 120d terminates in an opening in each of the top and bottom walls 120b, 120c. Top wall 120b and bottom wall 120c extend for a distance laterally outwardly beyond the exterior surface of peripheral wall 120a. This can be readily seen in FIG. 14. Connector 120 may be generally circular in shape when viewed from either of the top end or the bottom end. Furthermore, the bore 120d may be generally circular in shape when viewed from either of the top or bottom ends. Connector 120 is seated within a complementary shaped and sized aperture 116f of lower isolator 116 such that connector 120 is tightly retained within aperture 116f and a section of connector 120 extends outwardly for a distance beyond upper surface 116a of lower isolator 116.

Collar 124 includes an annular side wall 124a that bounds and defines a central opening 124b. As shown in FIG. 15, central opening 124b may be generally circular in shape. An upper wall 124c is provided at an upper end of side wall 124a. Upper wall extends laterally outwardly for a distance beyond an exterior surface of side wall 124a. A plurality of projections 124d extend inwardly into central opening 124b from an interior surface of side wall 124a. Each projection 124d defines a hole therein and through which one of the fasteners 22 will be inserted to join various components together (as has been described with respect to the components of isolating assembly 12.

Upper isolator 126 includes a top wall 126a, a bottom wall 126b, and a side wall 126c that extends between top and bottom walls 126a, 126b. Top wall 126a extends laterally outwardly for a distance beyond an exterior surface of side wall 126c. Side wall 126c bounds and defines a bore 126d that is accessible through openings in each of the top and bottom walls 126a, 126b. As shown in FIG. 15 bore 126d is generally circular in shape. A plurality of longitudinally extending slots 126e are defined in bottom wall 126b and side wall 126c of upper isolator 126. As illustrated in FIG. 15, slots 126e are defined at regular intervals about the circumference of bottom wall 126b. A hole (not numbered but shown in FIG. 15) is defined in the region of top wall 126a that overhangs each slot 126e. These holes are provided to each receive one of fasteners 22 therethrough. FIG. 14 shows that top wall 126a of upper isolator 126 defines a depression 126f therein that may be similar in shape and size to depression 116d in lower isolator 116. Bottom wall 126b of upper isolator 126 defines an aperture 126g therein that mirrors aperture 116f in lower isolator 116. Aperture 126g is complementary in shape to an upper region of connector 120 that includes top wall 120d. Aperture 126g is therefore substantially circular in shape when viewed from either of the top or bottom end of upper isolator 126.

As illustrated in FIG. 14, collar 124 is engaged around an exterior surface of side wall 126c of upper isolator. Furthermore, upper and lower regions of connector 120 are each received in one of the apertures 126g, 116f of upper and lower isolators 126, 116, respectively. Connector 120 may be of a sufficient length to cause a gap 142 to be defined between top surface 116a of lower isolator 116 and bottom wall 126b of upper isolator 126. Gap 142 helps ensure that upper isolator 126 is able to move relative to lower isolator 116 more easily. It will be understood that gap 142 may be quite minimal in nature so that upper and lower isolators 126, 116 are essentially touching each other but upper isolator 126 is still able to move back-and-forth relative to lower isolator 116.

Still referring to FIGS. 10-15, shell 130 comprises an annular side wall 130a and a top wall 130b that bound and define a cavity 130c that is accessible through an opening defined at a lower end of shell 130 (where the opening to cavity 130b is located opposite top wall 130b. A central hole 130d may be defined in top wall 130b and hole 130d may be in communication with cavity 130c. Hole 130d may include a countersunk region that is defined in top wall 130b, where this countersunk region is hexagonally shaped to receive a head 34a of bolt 34 therein. The shaft 34b of bolt 34 extends through hole 130d and extends for a distance outwardly beyond top wall 130b of shell 130 (as shown in FIG. 14). Tubular members 130e extend downwardly from an interior surface of top wall 130b of shell 130 and into cavity 130c thereof. Each tubular member 130e is positioned to be aligned with one of the slots 126e defined in upper isolator 126 when isolating assembly 112 is assembled. Each tubular member 130e may define a threaded bore (shown but not numbered in FIG. 15). Each fastener 22 extends into the threaded bore of one of the tubular members 130e when isolating assembly 112 is assembled.

The components of isolating assembly 112 are secured to each other in substantially the same way as are the components of isolating assembly 12. Consequently, the assembly of isolating assembly 12 will not be described herein. It should be noted, however, that shell 130 does not include a pin similar to pin 32 and therefore a projection 124d on collar 124 can be aligned with any slot 126e on upper isolator 126 and hole 28d in plate 28 and with tubular member 130e. It should also be noted that shell 130 also does not include a direction indicator 46 on the exterior surface of the shell's side wall 130a.

Isolating assembly 112 is engaged with turntable 114 in much the same manner as isolating assembly 12 is engaged with speaker 14. A threaded aperture (not shown) is defined in a bottom wall of turntable 114 or a mounting for turntable. The end 34c of the shaft 34b of bolt 34 is threadably engaged in the threaded aperture on turntable 114 and isolating assembly 112 is rotated in a first direction to secure bolt 34 into turntable 114.

Figure 13:
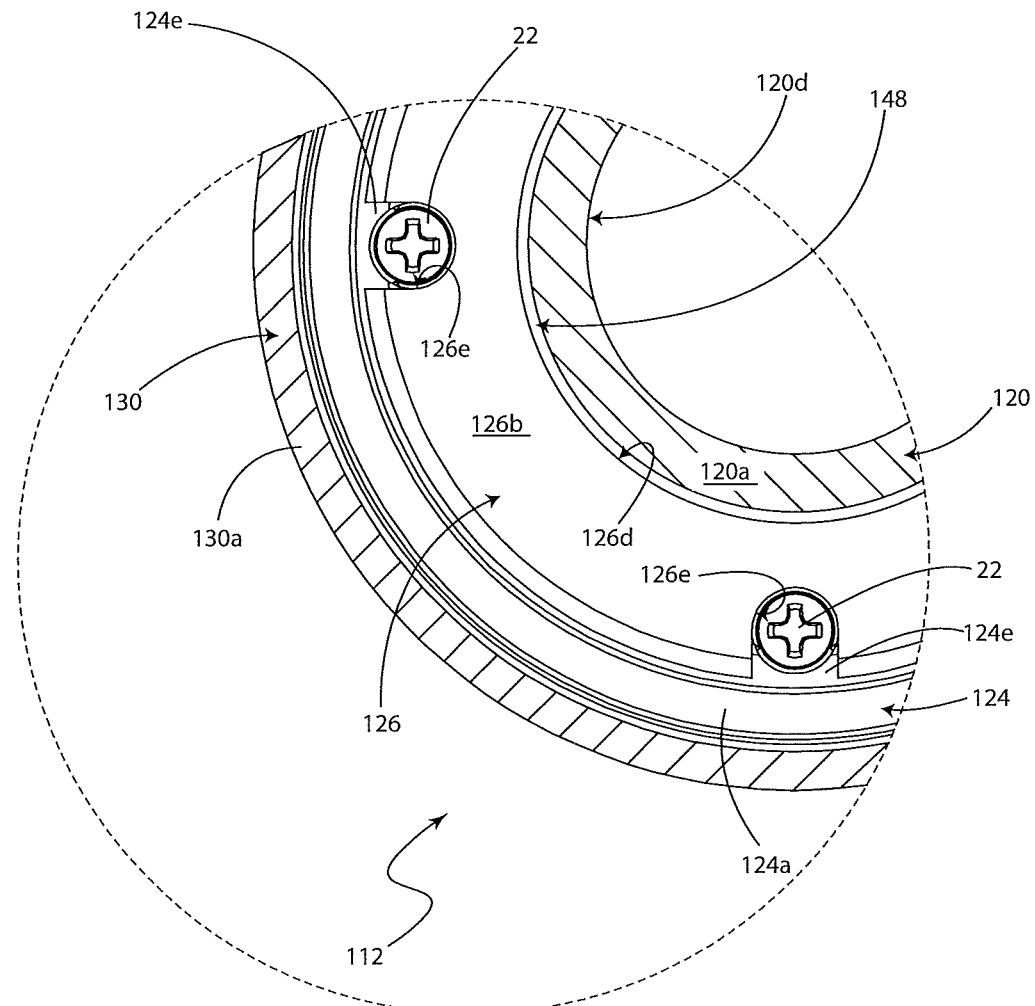
FIG. 13 is an enlargement of the highlighted region of FIG. 12.

When isolating assembly 112 is assembly together the connector 120 is received within the bore 126d of upper isolator 126. As shown in FIG. 13, the circumference of connector 120 is slightly smaller than the circumference of bore 126d. Connector 120 and bore 126d are generally circular and a gap 148 is defined between an exterior surface of connector 120 and an interior surface of the wall defining bore 126d. When turntable 114 is placed on a surface, such as surface "S" (FIG. 4), each lower isolator 116 of system 110 will rest on surface "S", the associated connector 20 extends vertically upwardly from lower isolator 116 and upper isolator 126 is engaged with connector 20. Any vibration generated when turntable 114 is used may cause lower isolator 116 to vibrate in unison therewith. Vibrations are attenuated as they travel down from the supported equipment 114 and up from the supporting surface or reflected back up from the supporting surface. (equipment and turntables may be very sensitive to vibrations in the supporting surface or their own vibrations being reflected back from that supporting surface.)

Figure 12:
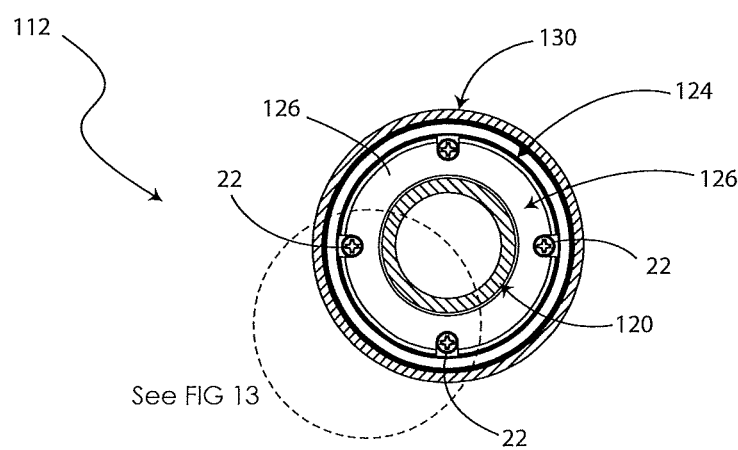
FIG. 12 is a cross-section of the single isolator taken along line 12-12 of FIG. 11.

The direction of vibration of upper isolator 126 may be in a horizontal plane and at any angle through 360°. Because connector 120 and bore 126d are generally circular, any reciprocating motion in opposed directions at any angle is possible. Two exemplary back and forth motions are illustrated in FIG. 12 as the directions indicated by arrows "C" and "D". Because the back and forth motion may be at any angle in the same plane through 360°, this isolating assembly 112 is considered to be omni-directional, multi-directional or non-directional. The resilient material of upper isolator 126 and lower isolator 116 absorbs at least some of the vibrations emanating from the vibration of turntable 114. The metallic ring 118, collar 124 and plate 128 provide strength to assembly 112. Ring 118 may include an annular side wall 118a that is of a complementary shape and size to the portion of lower isolator 116 that defines groove 116e. An annular flange 118b extends inwardly from an upper end of side wall 118b. The ring 118 and collar 124 also limit lateral travel of the resilient upper and lower isolators 126, 116 and thereby aid in prolonging the useful life thereof.

Referring to FIGS. 16-20, there is shown a third embodiment of an isolating assembly in accordance with an aspect of the present invention, where the assembly is generally indicated at 212. A plurality of isolating assemblies 212 may be utilized as an isolating system to dampen vibration in a piece of equipment such as speaker 14. Isolating assembly 212, like isolating assembly 12, may be a polarizing or directional isolating assembly that substantially prevents or reduces vibration in either of a front-to-back direction or a side-to-side direction but permits vibration in the other of the front-to-back direction or the side-to-side direction. So, as a polarizing isolating assembly 212 (like assembly 12), may dampen vibration in a first direction but permits vibration in a second direction that is at right angles to the first direction. This third embodiment may, however, have either the polarized or non-polarized internal configuration as outlined in the previous two embodiments. The difference in the configuration of this third embodiment is that instead of having bolt or stud 34 to attach the unit to the support equipment, the upper isolator protrudes through the housing and is in contact with the underside of the supported equipment. Isolator 26 is in contact with the equipment, with concave section 26f causing a suction cup effect to adhere to the equipment. Shape, thickness and durometer of the isolator is modified for weight ranges of equipment. The shape of the inside of the isolator and connector 20 determine if the assembly is polarized or non-polarized.

Figure 20:
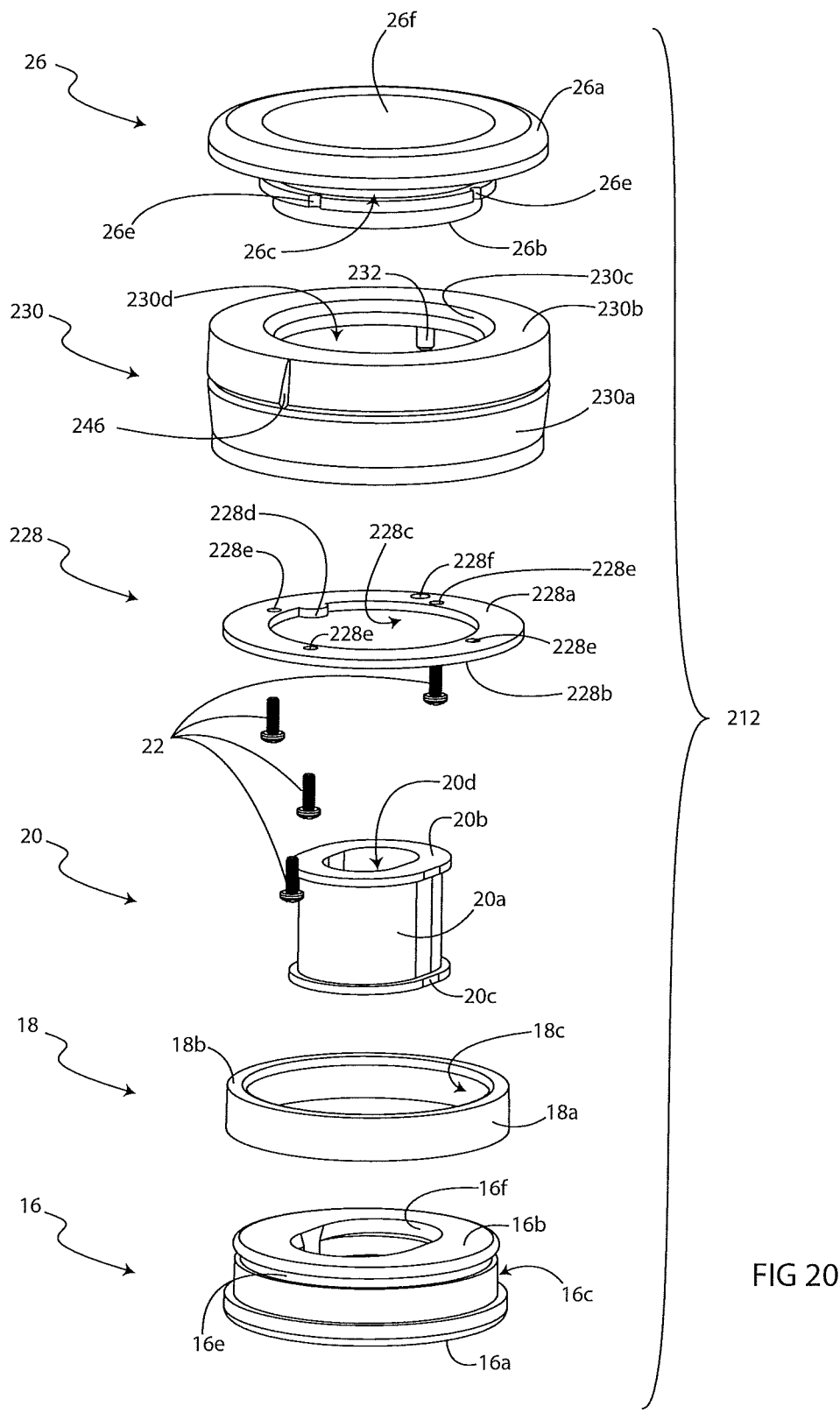
FIG. 20 is an exploded view of the isolating assembly of FIG. 16.
Figure 21:
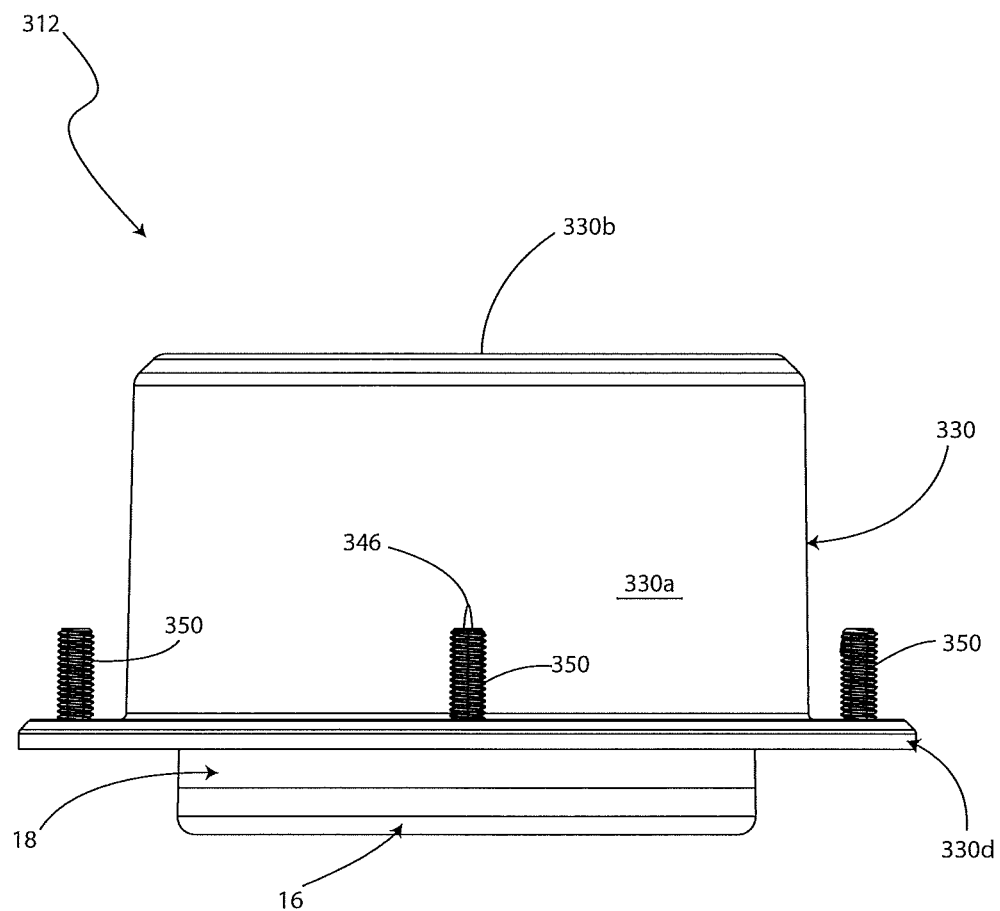
FIG. 21 is a front elevational view of a fourth embodiment of an isolating assembly useful for installation in a large hole defined in a bottom of a piece of equipment such as a speaker.
Figure 22:
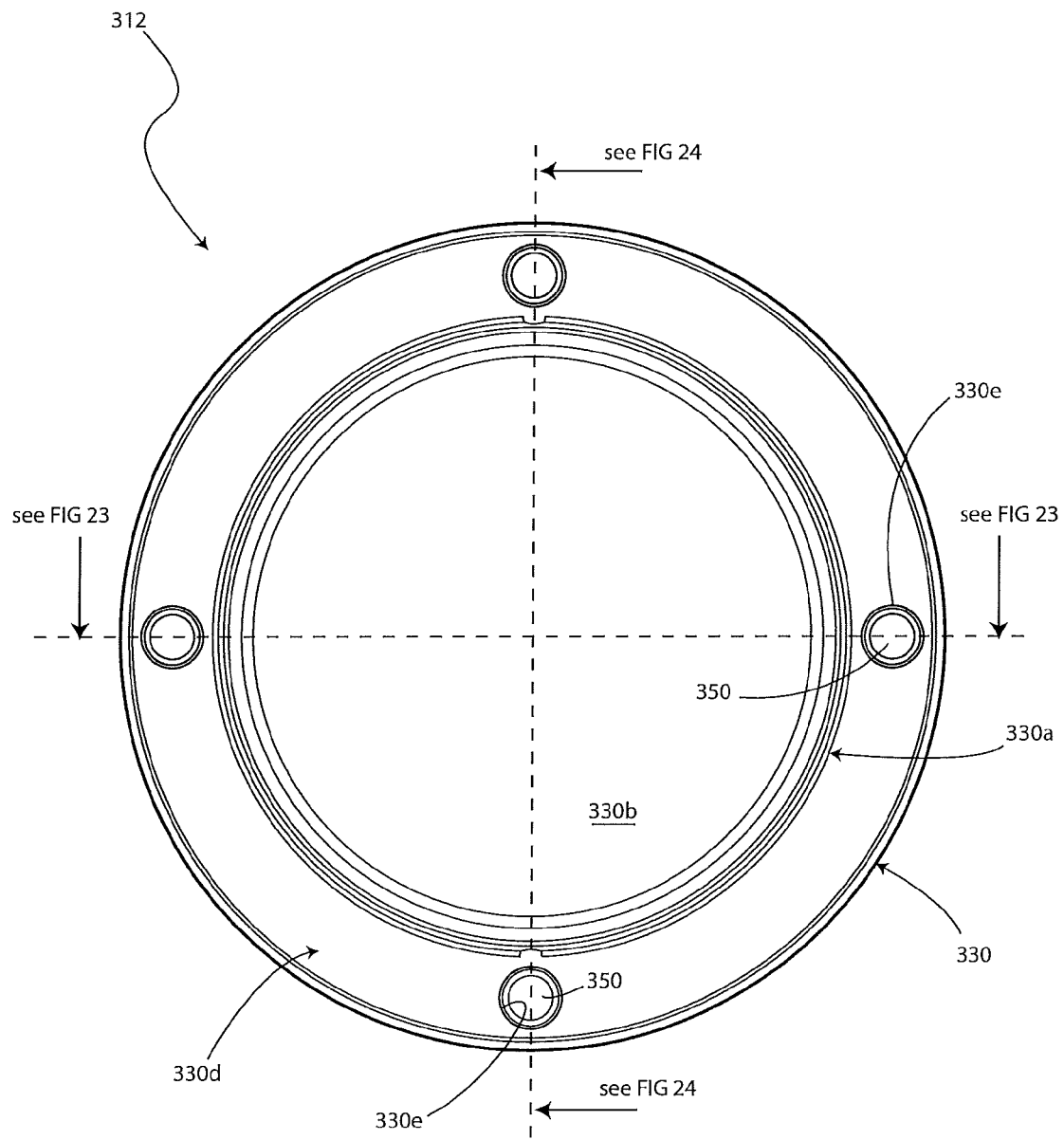
FIG. 22 is a top plan view thereof.
Figure 23:
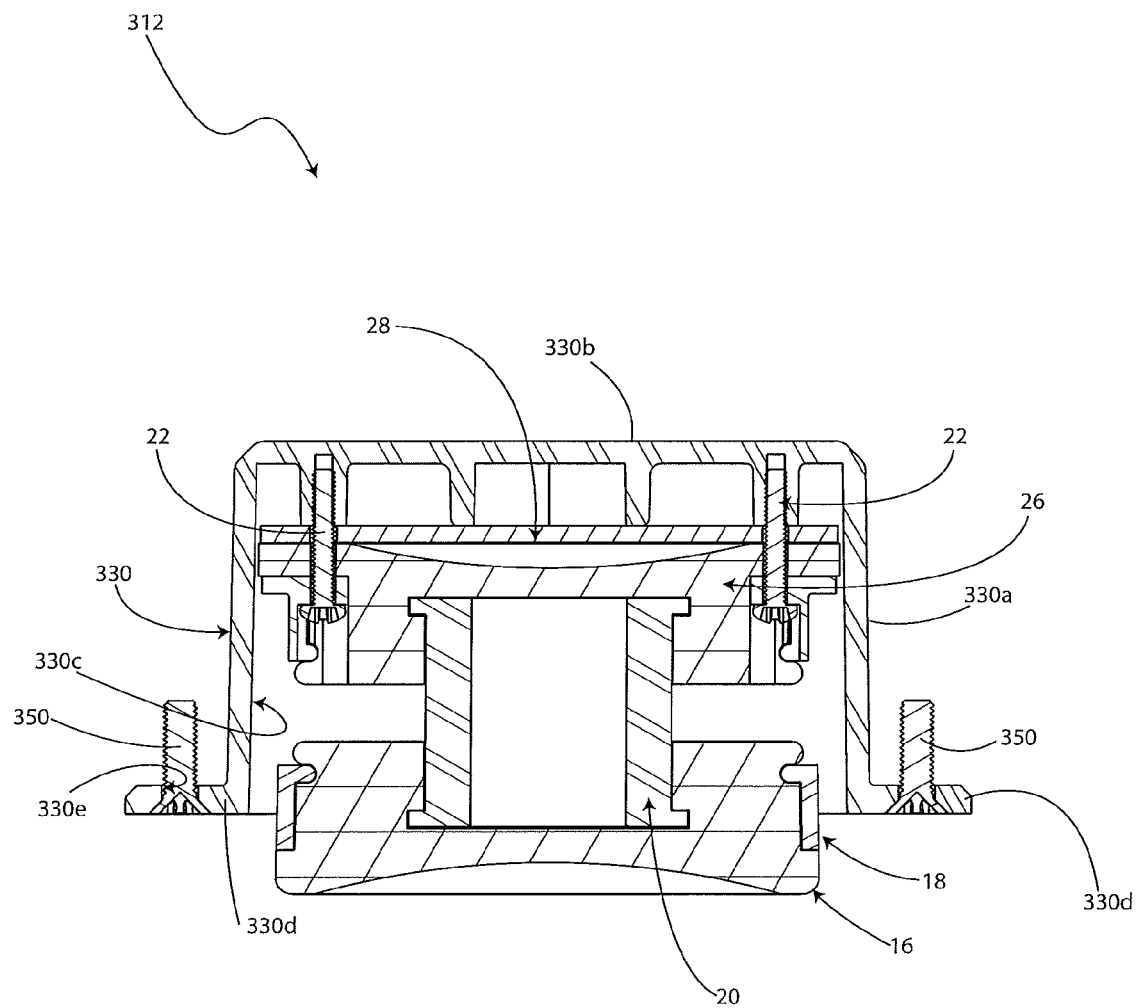
FIG. 23 is a cross-section of the isolating assembly taken along line 23-23 of FIG. 22.
Figure 24:
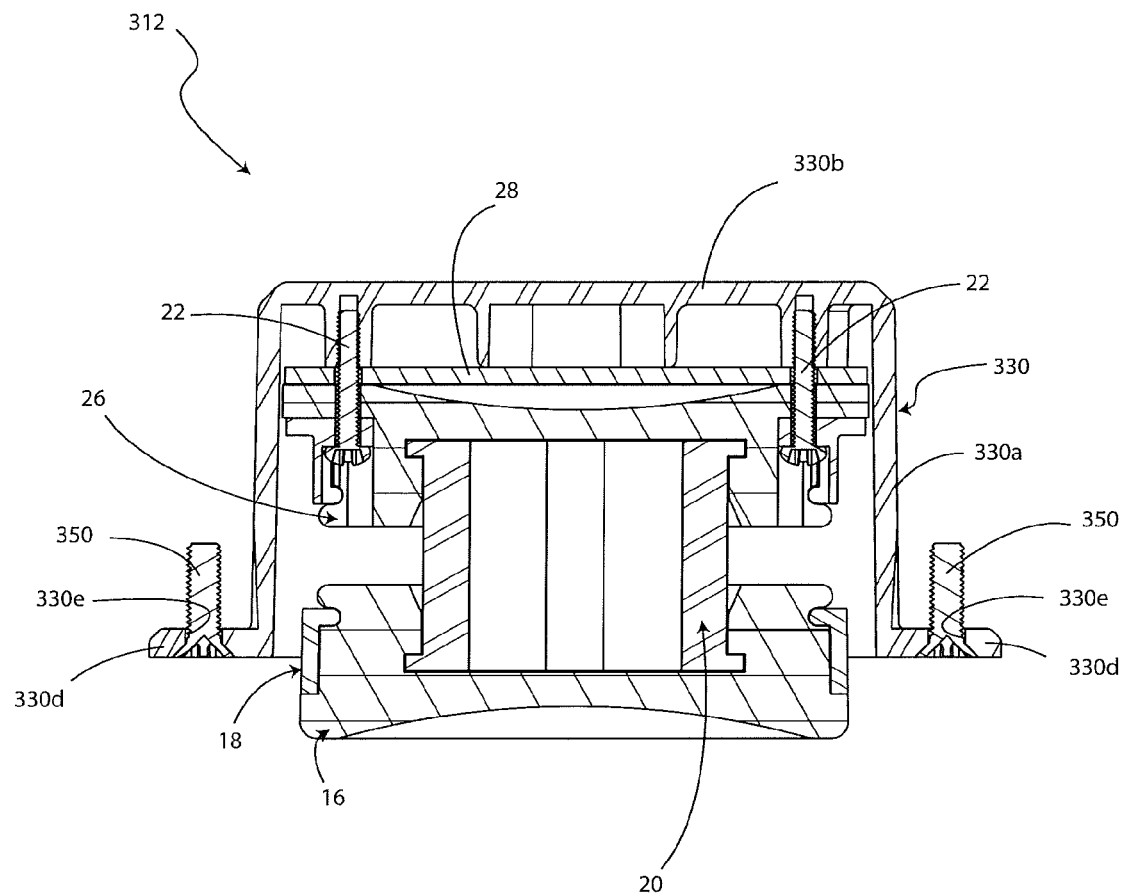
FIG. 24 is a cross-section of the isolating assembly taken along line 24-24 of FIG. 22.
Figure 25:
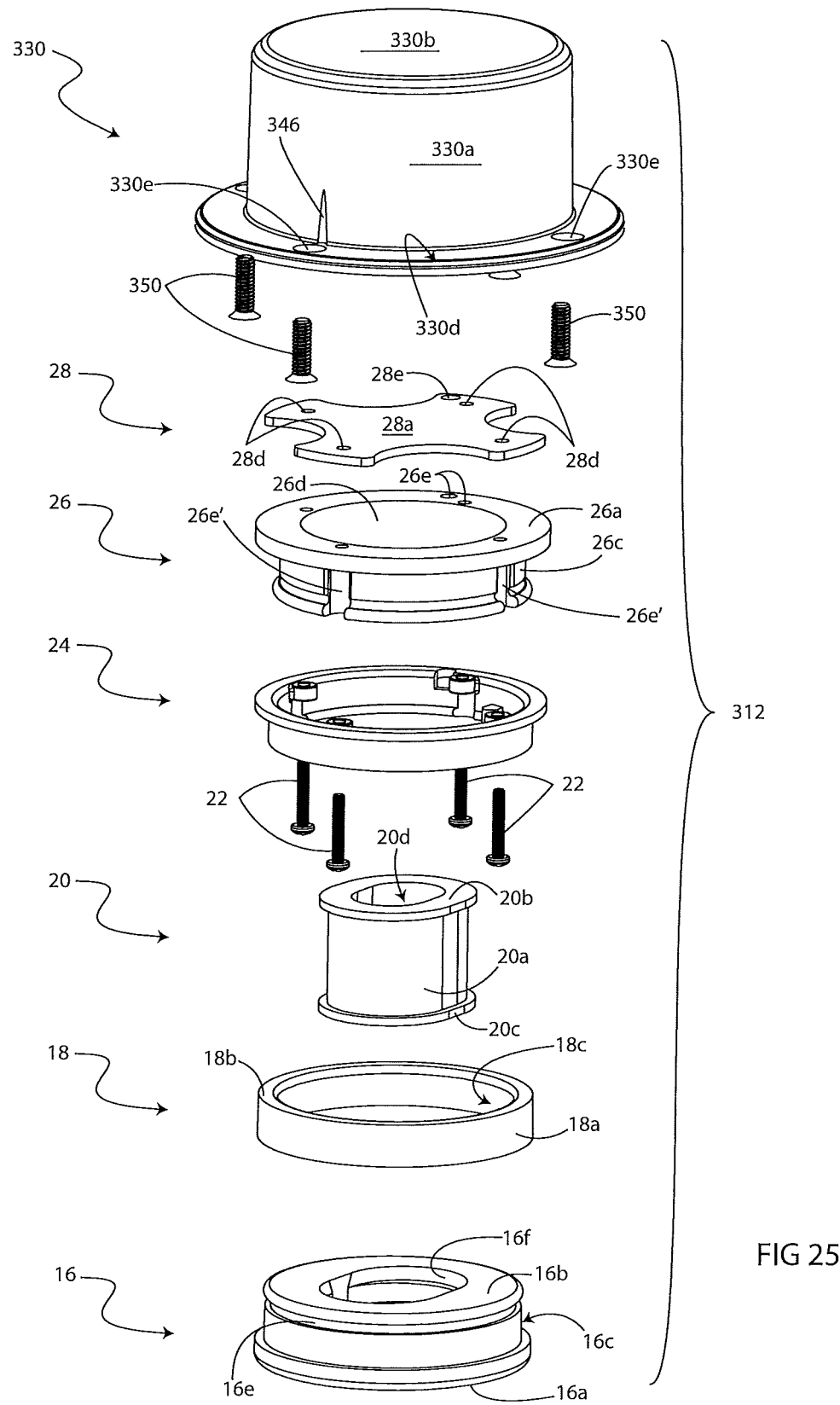
FIG. 25 is an exploded view of the isolating assembly of FIG. 21.
Figure 26:
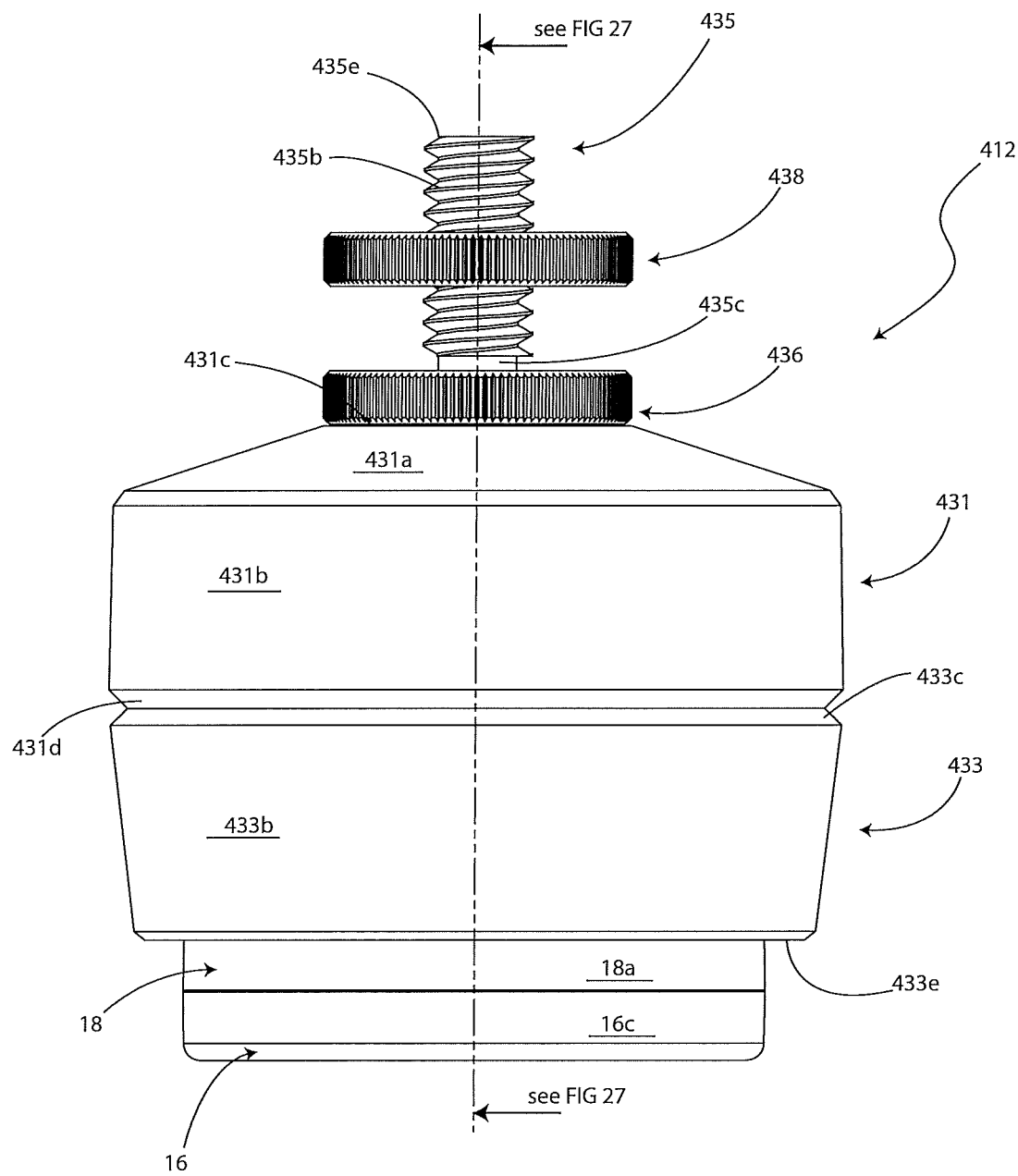
FIG. 26 is a front elevation view of a fifth embodiment of an isolating assembly.

FIG. 20 shows an exploded view of isolating assembly 212 comprising a lower isolator, a ring, a connector, fasteners, a plate, an upper isolator, and a shell. The lower isolator, ring, connector, fasteners and upper isolator are all substantially identical in structure and function to the lower isolator 16, ring 18, connector 20, fasteners 22 and upper isolator 26 of isolating assembly 12. These several components are identified in FIG. 20 using the same numbers as were utilized in FIGS. 1-9 and therefore will not be further described herein.

In addition to the aforementioned components, isolating assembly 212 also includes a rigid plate 228 (FIGS. 18-20), preferably fabricated from metal that is positioned between ring 18 and shell 230. Plate 228 is a substantially planar member that is shaped as an annular ring. Plate 228 includes an upper surface 228a and a lower surface 228b. A central bore 228c is defined by plate 228 and bore 228c extends between upper and lower surfaces 228a, 228b. Plate 228 includes a detent 228d that extends laterally inwardly into bore 228c. Plate 228 also defines a number of holes 228e and an aperture 228f therein; each hole 228e and aperture 228f extending between upper and lower surfaces 228a, 228b. The number of holes 228e is complementary to the number of fasteners 22 that are to be used to secure the various components together.

Shell 230 includes a side wall 230a and a top wall 230b that is provided at an upper end of side wall 230a. An opening 230c is defined in top wall 230b. Side wall 230a and top wall 230b bound and define a cavity 230d and opening 230c is in communication with cavity 230d. Cavity 230d is sized to receive a lower region of upper isolator 26, plate 228, connector 20, and an upper region of lower isolator 16 therein. The lower region of upper isolator 26 (i.e., the region that includes bottom surface 26b) is of a smaller circumference than the rest of upper isolator 26. This lower region of upper isolator 26 extends through opening 230c of shell 230 and into cavity 230d. In order to correctly orient upper isolator 26, one of the slots 26e defined therein is aligned with pin 232 that extends downwardly from an inner surface of top wall 230b of shell. Plate 228 is inserted into cavity 230d and is moved into a position where holes 228e align with slots 26e in upper isolator 26 and aperture 228f receives pin 232 therethrough. Fasteners 22 extend through holes 228e and into slots 26e and then into each threaded recesses 230g defined in top wall 230b of shell 230. Fasteners 22 therefore secure plate 228, shell 230 and upper isolator 26 together. One end of connector 20 is received in the bore 26d defined in upper isolator 26 and extends outwardly therefrom. The other end of connector 20 is received in the aperture 16f defined in lower isolator 16. A gap 248 is defined between upper and lower isolators 26, 16; so the only connection between upper and lower isolators 26, 16 is connector 20.

Figure 16:
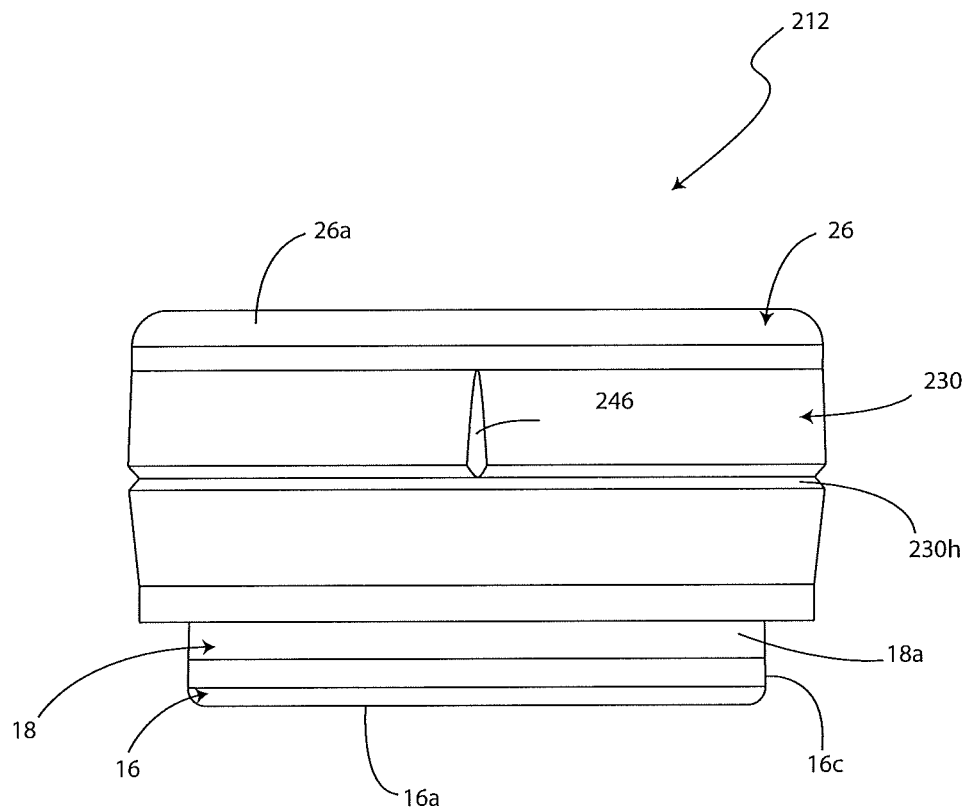
FIG. 16 is a front elevational view of a third embodiment of an isolating assembly showing a directional indicator thereon and a rubber top.
Figure 17:
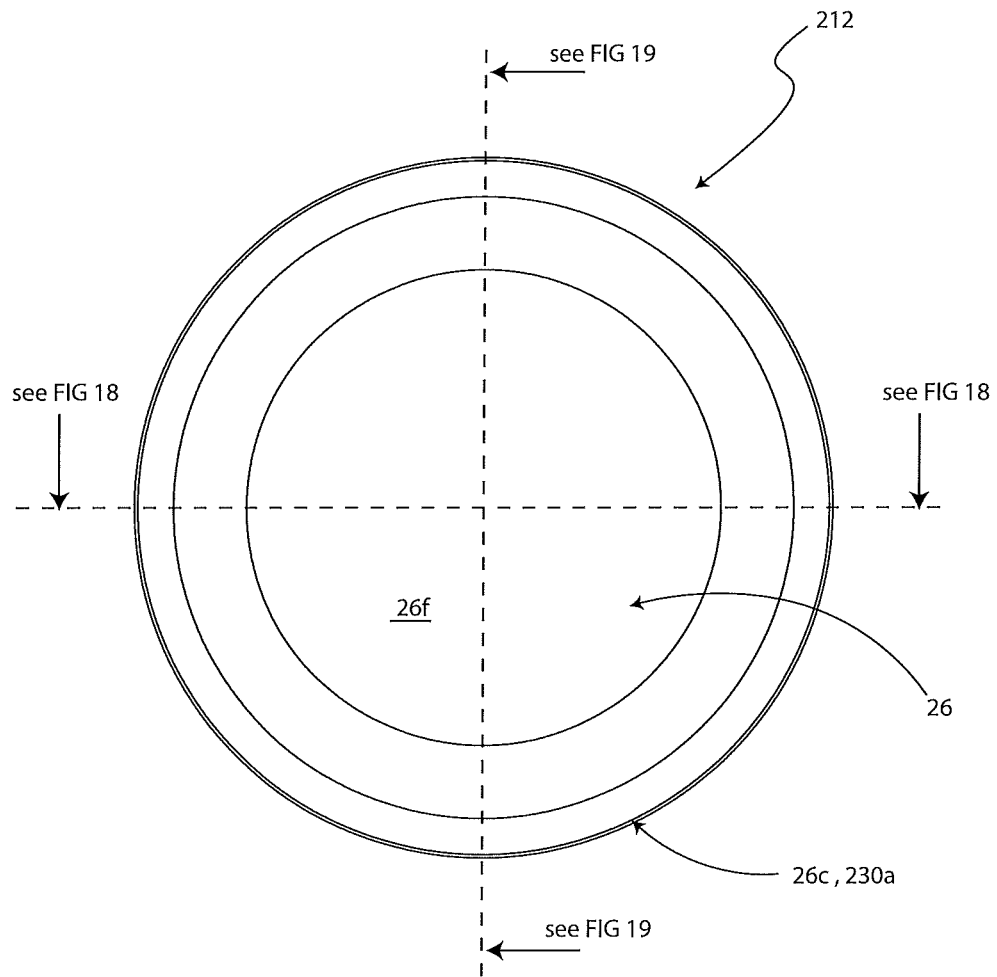
FIG. 17 is a top plan view thereof.
Figure 18:
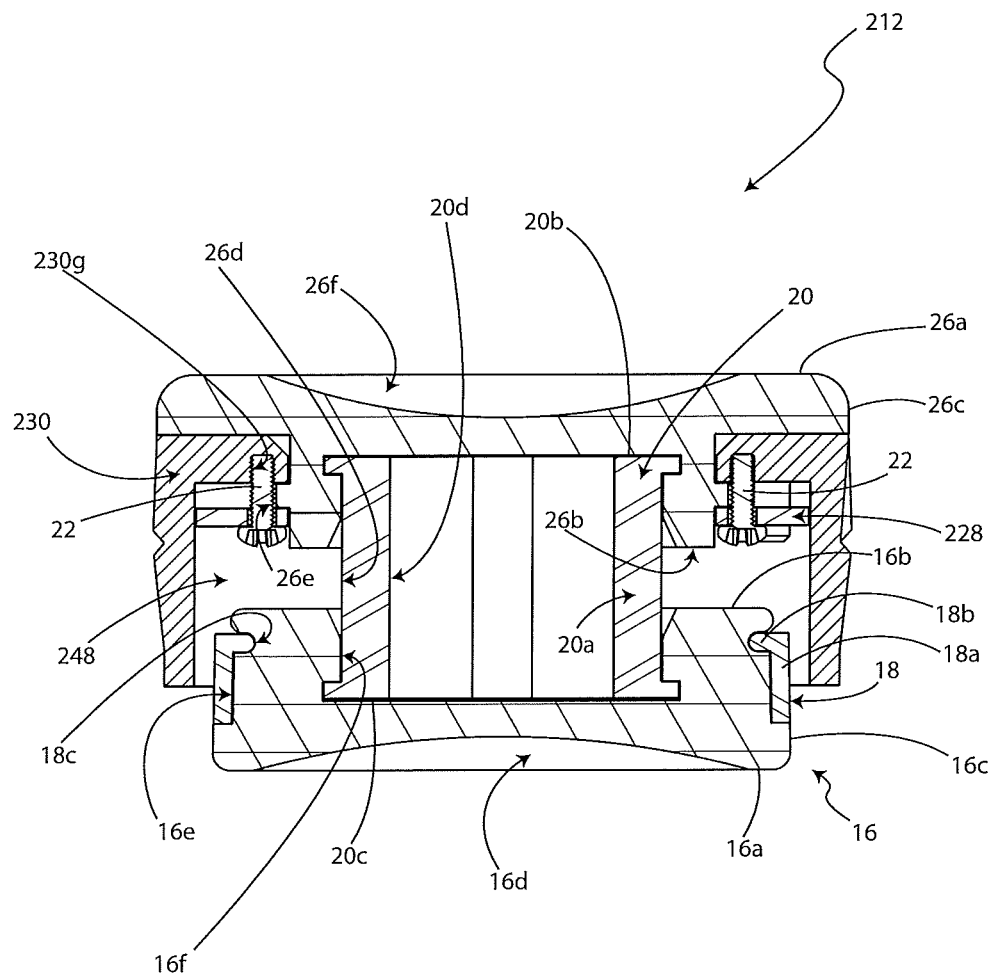
FIG. 18 is a cross-section of the isolating assembly taken along line 18-18 of FIG. 17.
Figure 19:
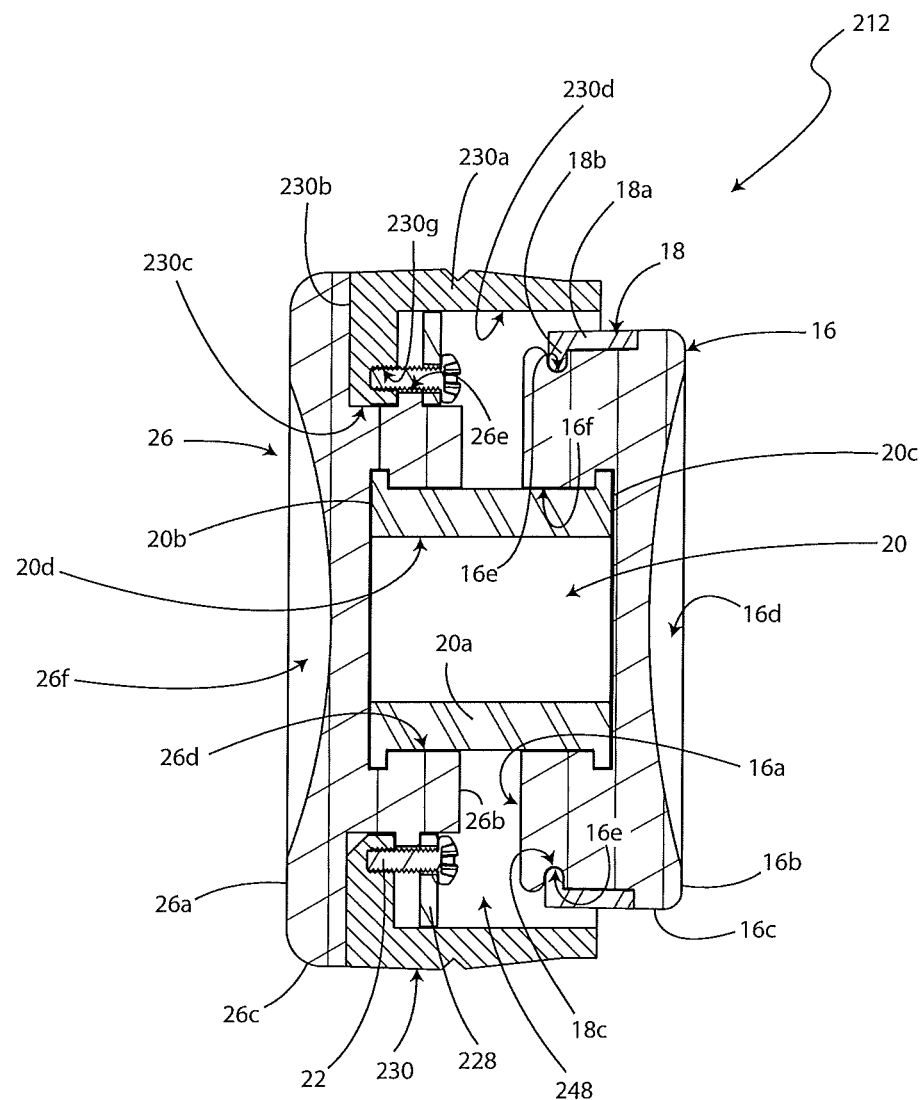
FIG. 19 is a cross-section of the isolating assembly taken along line 19-19 of FIG. 17.

When isolating assembly 212 is engaged with a piece of equipment, such as a speaker, a plurality of isolating assemblies 212 may each be positioned under a bottom wall of a speaker 14, for example, such that they contact the surface thereof, without fasteners. In other words, no fasteners are used to secure isolating assembly 212 to speaker 14. Each lower isolator 16 is placed in contact with surface "S"; connector 20 engaged therewith extends vertically upwardly from lower isolator 16; and upper isolator 26 is engaged with connector 20 and is positioned vertically above lower isolator 16. Speaker 14 rests on top surface 26a of upper isolator 26. When speaker 14 vibrates, that vibration motion is transferred to the upper isolators 26 of the several isolating assemblies 212. Then, because of the oval shape of the connector 20, bore 26d and aperture 16f, the vibratory motion is polarized by isolating assembly 212 and will subsequently be transferred to lower isolators 16 so that isolating assembly 212 will move in a direction back-to-front manner or a side to side manner depending on which way the direction indicators 246 on shell 230 are all facing. FIG. 16 shows that the exterior surface of shell 230 defines an annular groove 230h that circumscribes the surface. Groove 230h may be provided to align with a bottom end of speaker 14.

The way that isolating assembly 212 dampens vibrations is substantially identical to the way isolating assembly 12 dampens vibrations and so this will not be further described herein.

Referring to FIGS. 21-25, there is shown a fourth embodiment of an isolating assembly in accordance with an aspect of the present invention, generally indicated at 312. (This fourth embodiment may include polarized or non-polarized isolators but only of these will be further described herein.)

Isolating assembly 312 is designed to be inserted into a large aperture defined in a bottom wall of a speaker 14 or other piece of equipment or within a plinth to support speakers or equipment. These large apertures, while not illustrated in the accompanying figures, are of a sufficient size to each receive the uppermost end of the isolating assemblies 312 therein.

Isolating assembly 312 includes all of the same components as isolating assembly 12. So, isolating assembly 312 includes a lower isolator 16, a ring 18, connector 20, fasteners 22, collar 24, upper isolator 26 and a shell. All of the components of isolating assembly 312 are substantially identical in structure and function to the lower isolator 16, ring 18, connector 20, fasteners 22, collar 24, and upper isolator 26 and therefore will not be described further herein. The only component of isolating assembly 312 that is different to those of isolating assembly 12 is the shell 330.

Shell 330 comprises a side wall 330a with a top wall 330b that bound and define a cavity 330c therein. An annular flange 330d extends laterally outwardly from a bottom end of side wall 330a. A plurality of holes 330e are defined at intervals in flange 330d and holes 330e extend between an upper surface and a lower surface of flange 330d. A plurality of fasteners 350 extend upwardly through holes 330e from the lower surface toward the upper surface thereof. Exterior surface 330a also includes a direction indicator 346 thereon that is used for the same purpose as direction indicator 46 on isolating assembly 12.

When isolating assembly 312 is used, the upper end thereof is inserted into a large aperture defined in the underside of speaker 14. When isolating assembly 312 is received within the large apertures in the speaker 14, side wall 330a and top wall 330b are received within the large aperture and flange 330d rests against the underside of the speaker 14. Fasteners 350 are inserted through apertures 330a and are screwed into the underside of speaker 314.

Referring to FIGS. 26-30 there is shown a fifth embodiment of an isolating assembly in accordance with an aspect of the invention, generally indicated at 412. Isolating assembly 412 includes a lower isolator 16, a ring 18, a flanged oval connector 20, a plurality of fasteners 22, a collar 124, an upper isolator 126, a shell 30, a lock washer 36, and a lock nut 38. The lower isolator 16, ring 18, and connector 20 in isolating assembly 412 are substantially identical to the lower isolator 16, ring 18 and connector in isolating assembly 12 and will therefore not be described further herein. The collar 124 and upper isolator 126 in isolating assembly 412 are substantially identical to the collar 124 and upper isolator 126 of isolating assembly 112 and therefore will be described further herein. Relative to isolating assembly 12, isolating assembly 412 does not include the plate 28, the pin 32, or the mounting bolt 34. Additionally, shell 30 of isolating assembly 12 is replaced with an upper shell 431 and a lower shell 433 that interlock with each other. Upper shell 431 includes an exterior wall that includes an annular sloped region 431a and an annular tubular region 431b. Upper shell 431 further includes a top end 431c and a bottom end 431d. Bottom end 431d may be beveled as is shown in the attached figures. A threaded recess 431e is defined in top end 431c and a cavity 431f is defined in upper shell 431 and is accessible through an opening in bottom end 431d. One or more threaded slots 431g are defined in a lower surface of sloped region 431a. Recess 431e is not in communication with cavity 431f. Slots 431g are in communication with cavity 431f.

Lower shell 433 includes a tubular first region 433a and a tubular second region 433b that are connected together by an annular shoulder 433c. Lower shell 433 also includes an end wall 433d and an edge 433e remote from end wall 433d. A plurality of apertures 433f is defined in end wall 433d. First region 433a, second region 433b and end wall 433d bound and define a chamber 433g. Apertures 433f are in communication with chamber 433g. Shoulder 433c may be beveled as is shown in the attached figures. The angle of the bevel on shoulder 433c may be a mirror image of the angle of the bevel on lower end 431d of upper shell 431 so that the two beveled surfaces 431d, 433c form a generally V-shaped groove around the circumference of isolating assembly 412.

Figure 27:
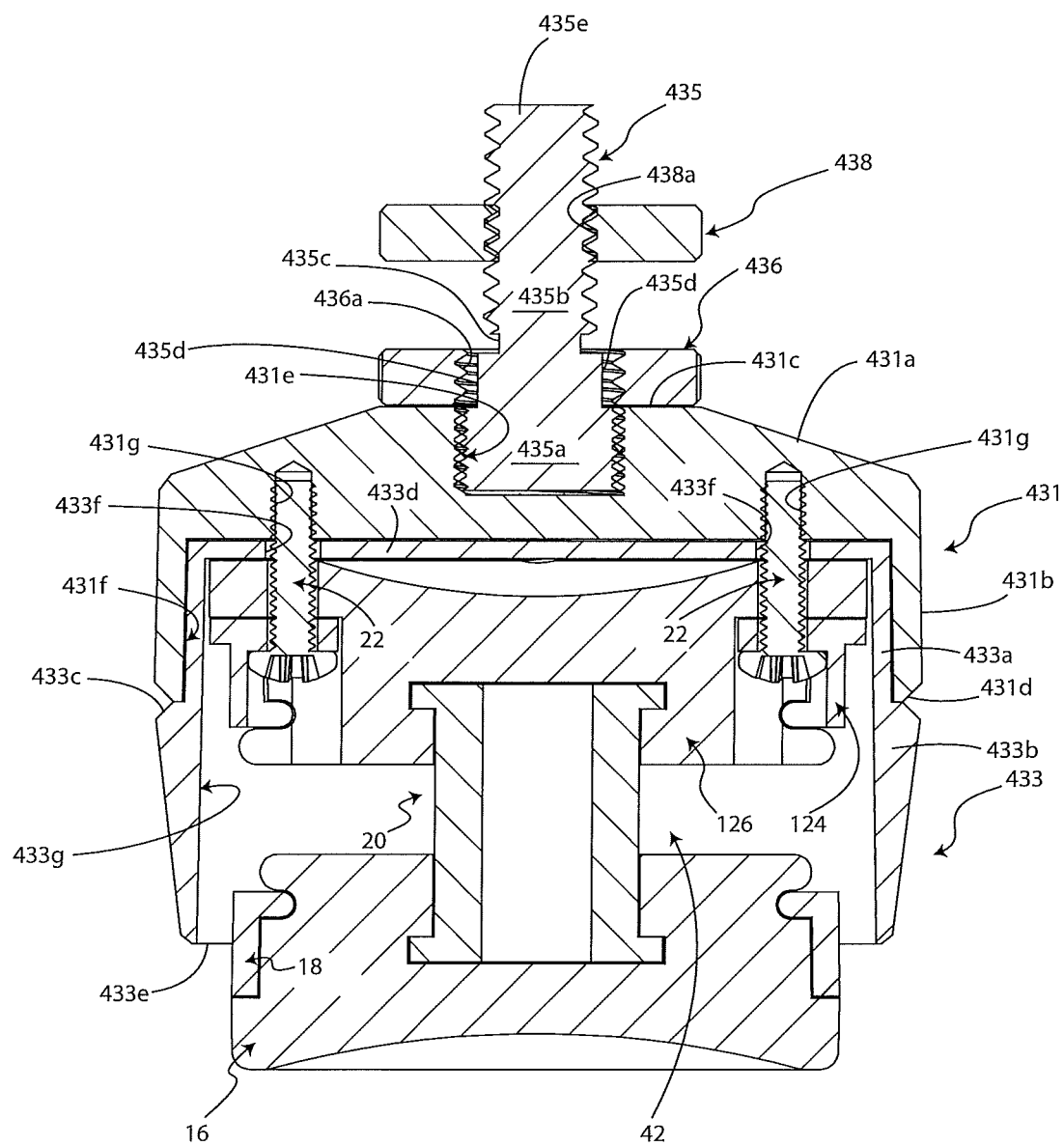
FIG. 27 is a longitudinal cross-sectional view of the isolating assembly taken along line 27-27 of FIG. 26.
Figure 28:
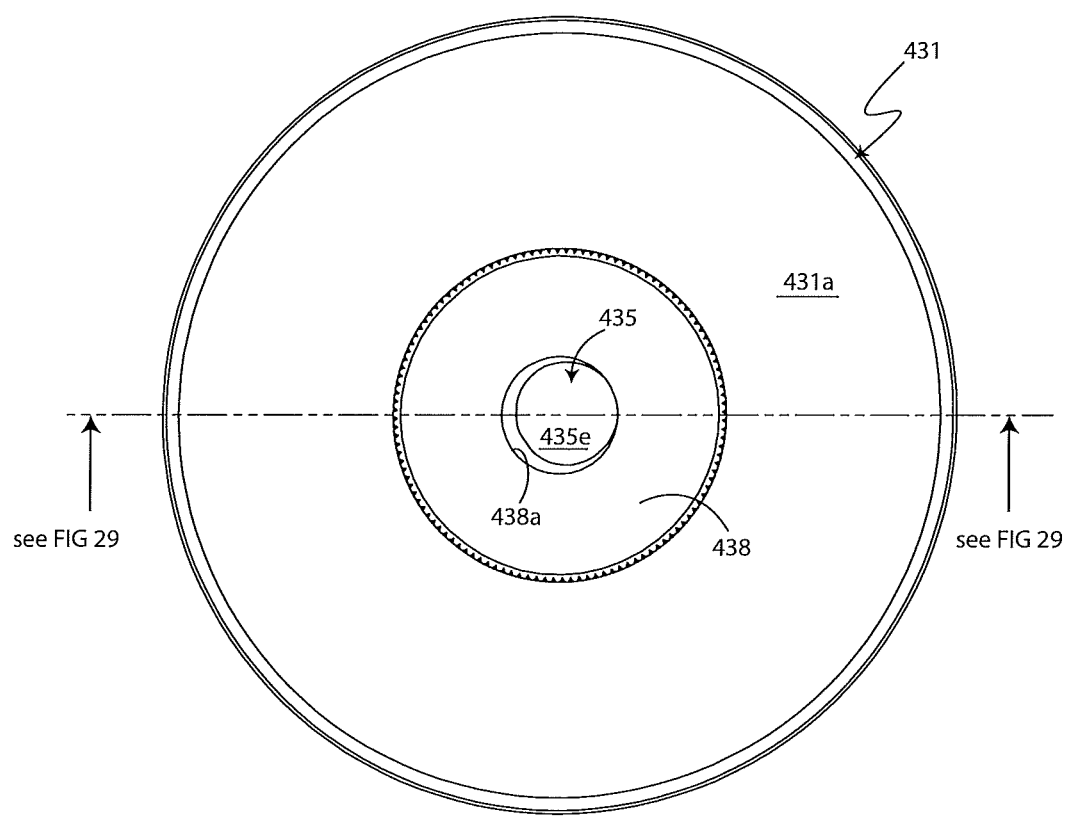
FIG. 28 is a top plan view of the isolator of FIG. 26.
Figure 29:
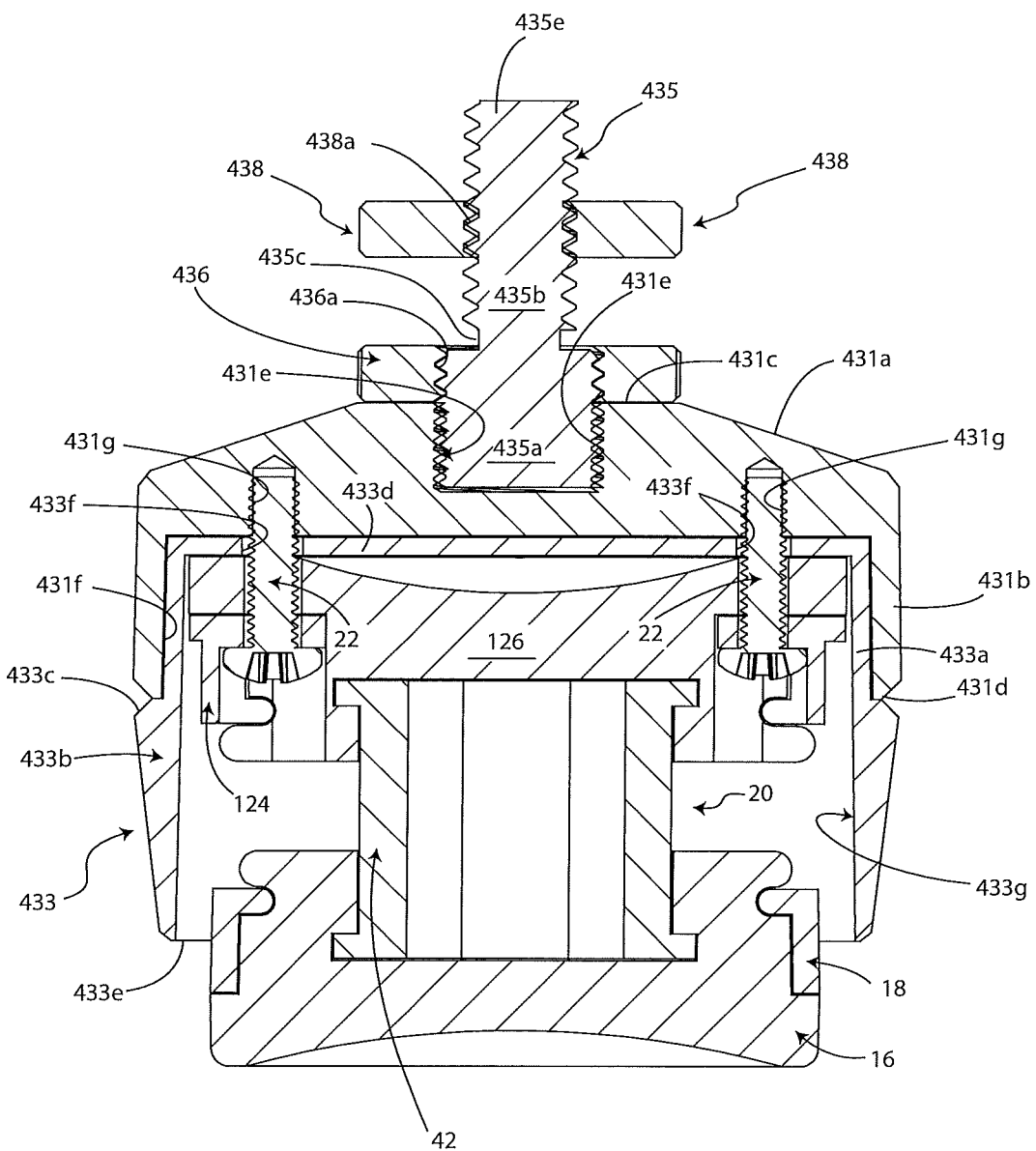
FIG. 29 is a longitudinal cross-section of the isolating assembly taken along line 29-29 of FIG. 28.
Figure 30:
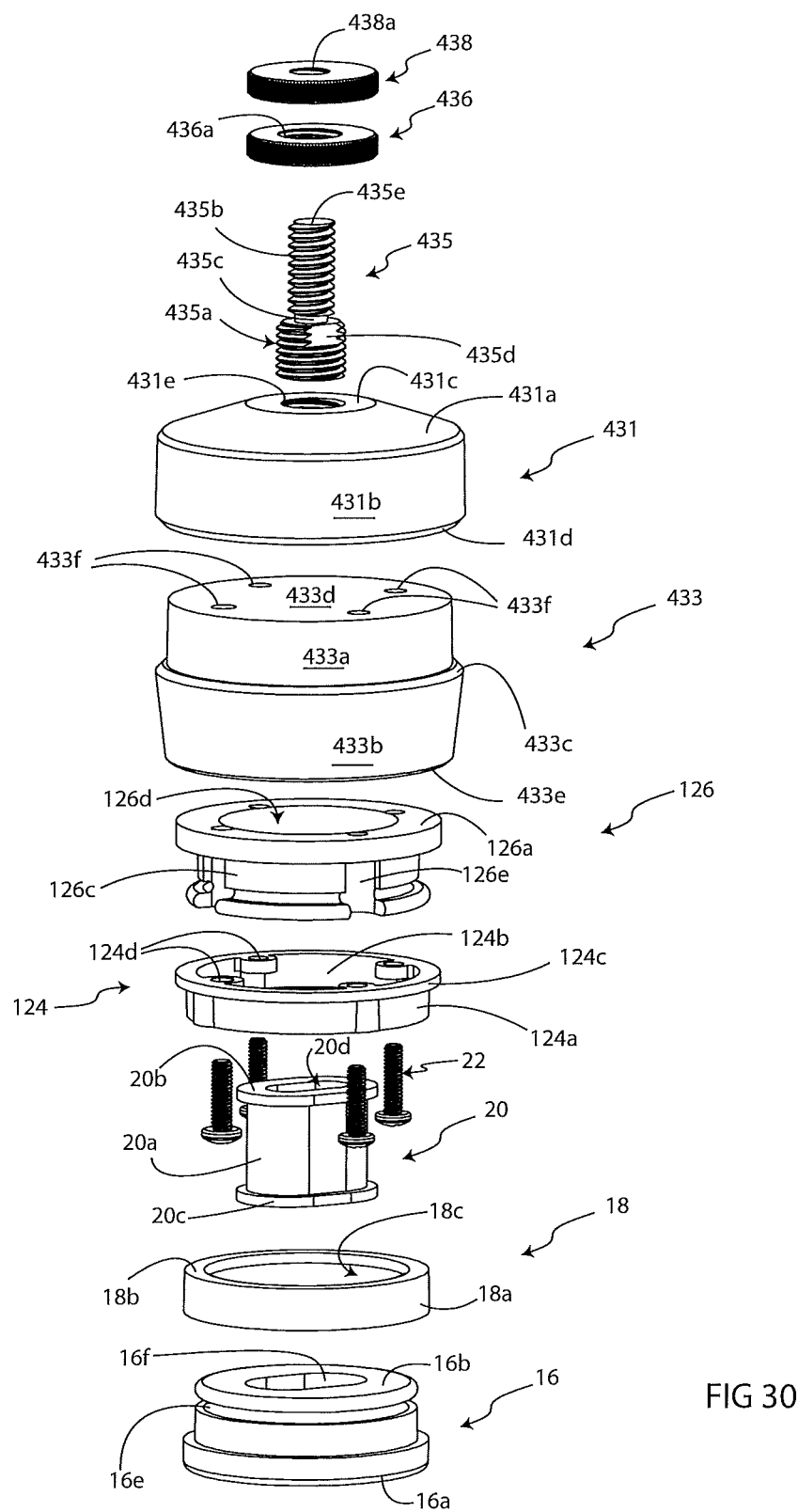
FIG. 30 is an exploded perspective view of the isolating assembly shown in FIG. 26.

First region 433a may be of a reduced diameter relative to second region 433b. The diameter of first region 433a may be complementary to the interior diameter of cavity 431f of upper shell 433 and first region 433a is receivable within cavity 431f of upper shell 431. FIGS. 27 and 29 show that first region 433a is tapered, being of a greater diameter proximate shoulder 433c and of a lesser diameter proximate end wall 433d. Upper isolator 126, collar 124, connector 20, and part of ring 18 and lower isolator 16 are received within chamber 433g. Fasteners 22 are utilized to secure collar 124 and upper isolator 126 to sloped region 431a of upper shell 431. Lower isolator 16 is separated from upper isolator 126 by connector 20 in such a manner that a gap 42 is defined between upper isolator 126 and lower isolator 16.

It is contemplated that the upper shell 431, lower shell 433 upper isolator 126, connector 20 and lower isolator 16 (with ring 18 and collar 124) will remain connected together at all times. Isolating assembly 412 is provided with a mechanism that may be used to selectively attach assembly 412 to an acoustic device such as a speaker or turntable or to a support assembly such as a cabinet or shelf. The connection mechanism comprises a lock washer 436, a lock nut 438 and a stud 435. Nut 438 is similar to nut 38 and defines a threaded hole 438a therethrough. Washer 436 is similar to washer 36 and defines a threaded hole 436a therethrough but the hole 436a (FIG. 27) is of a greater diameter than the diameter of hole 36a (FIG. 8). As is evident from FIGS. 27 and 29, the diameter of hole 436a is substantially the same size as the diameter of recess 431e in upper shell 431. As indicated above a stud 435 is provided as part of the connection mechanism. Stud 435 includes a head 435a and a shaft 435b that extends outwardly from one end of head 435a. Head 435a is of a greater diameter than is shaft 435b. Both the head 435a and shaft 435b are threaded except that a region 435c of shaft 435b adjacent head 435a is free of threads and two opposing regions 435d (FIGS. 27 and 30) of head 435a are free of threads. Region 435c is a non threaded area that makes it easier to machine threads in stud 435. The opposing regions 435d are free of threads to provide a location to engage stud 435 with a wrench. Once stud 435 has been threadably engaged with shell 431/432, nut 436 is rotated downwardly to a position adjacent nut 438 in order to lock stud 435 in place.

Head 435a is of a diameter that is complementary to the diameter of threaded recess 431e in upper shell 431 and of hole 436a of washer 436. Shaft 436b is of a diameter that is complementary to hole 438a of nut 438. An end 435e of shaft 435 projects outwardly beyond nut 438. Stud 436 is insertable and engageable with upper shell 431 without needing to take the rest of isolating assembly 412 apart. The sloped region 431a of upper shell 431 is substantially thicker than is top wall 30b of shell 30 of isolating assembly 12. This may be seen by comparing FIG. 27 and FIG. 8. Apart from recess 431e, slope region 431a may be substantially solid. Stud 435 may simply be rotated into engagement with upper shell 431 by threadably engaging the threads on head 435a of stud 435 with the threads that line recess 431e. It is therefore relatively simple to replace stud 435 with another similarly configured stud in order to secure isolating assembly 412 to a different piece of audio equipment or support component.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. An isolating assembly for use with a piece of equipment or a structure that vibrates or is sensitive to vibrations, said isolating assembly comprising:
    a lower isolator adapted to rest upon a flat surface;
    an upper isolator adapted to be engaged with the piece of equipment or the structure;
    a connector having first and second ends; wherein the first end engages the lower isolator and the second end engages the upper isolator; and upper isolator is positioned above the lower isolator; and
    an engagement member adapted to engage the isolating assembly with the piece of equipment or the structure and wherein the engagement member comprises a shell defining a cavity therein; and wherein the upper isolator is receivable within the cavity and is securable to the shell; and wherein the shell has an upper surface that is adapted to contact a bottom wall of the piece of equipment or the structure.

2. The isolating assembly as defined in claim 1, wherein a bottom surface of the upper isolator is spaced a distance away from a top surface of the lower isolator; and wherein the upper isolator is movable relative to the lower isolator.

3. The isolating assembly as defined in claim 1, wherein the connector is a polarizing connector that permits the upper isolator to move back-and-forth in a first direction and in a direction opposite to the first direction but does not permit the upper isolator to move back and forth in a second direction and in a direction opposite to the second direction; where the first direction and second direction are at right angles to each other.

4. The isolating assembly as defined in claim 1, wherein the connector has a generally oval shape when viewed from either of the first and second ends.

5. The isolating assembly as defined in claim 1, wherein the connector is a non-polarizing connector that allows the upper isolator to move back-and-forth relative to the lower isolator in a first direction and in a direction opposite to the first direction and allows the upper isolator to move back-and-forth relative to the lower isolator in a second direction and in a direction opposite to the second direction; where the first direction and second direction are at an angle relative to each other.

6. The isolating assembly as defined in claim 5, wherein the upper isolator is movable back-and-forth relative to the lower isolator in a horizontal plane and at any angle through 360°.

7. The isolating assembly as defined in claim 1, wherein the connector is generally circular in cross-section when viewed from either of the first and second ends.

8. The isolating assembly as defined in claim 1, wherein the engagement member further comprises a fastener that extends outwardly from the upper surface of the shell; and the fastener is adapted to be secured to the bottom wall of the piece of equipment or the structure.

9. The isolating assembly as defined in claim 1, wherein the shell has a side wall and an exterior surface of the side wall includes a direction indicator thereon.

10. The isolating assembly as defined in claim 1, wherein the upper isolator and lower isolator are fabricated from a resilient material and the connector is fabricated from a rigid material.

11. An isolating assembly for use with a piece of equipment or a structure that vibrates or is sensitive to vibrations, said isolating assembly comprising:
   a lower isolator adapted to rest upon a flat surface;
   an upper isolator adapted to be engaged with the piece of equipment or the structure; and
   a connector having first and second ends; wherein the first end engages the lower isolator and the second end engages the upper isolator; and upper isolator is positioned above the lower isolator; wherein the upper isolator is fabricated from a resilient material and the isolating assembly further comprises a collar that circumscribes at least a section of a side wall of the upper isolator; and wherein the collar is fabricated from a rigid material.

12. The isolating assembly defined in claim 11, wherein the connector is a polarizing connector that permits the upper isolator to move back-and-forth in a first direction and in a direction opposite to the first direction but does not permit the upper isolator to move back and forth in a second direction and in a direction opposite to the second direction; where the first direction and second direction are at right angles to each other.

13. An isolating assembly for use with a piece of equipment or a structure that vibrates or is sensitive to vibrations, said isolating assembly comprising:
   a lower isolator adapted to rest upon a flat surface;
   an upper isolator adapted to be engaged with the piece of equipment or the structure; and
   a connector having first and second ends; wherein the first end engages the lower isolator and the second end engages the upper isolator; and upper isolator is positioned above the lower isolator; wherein the lower isolator is fabricated from a resilient material and the isolating assembly further comprises a ring that circumscribes at least a section of a side wall of the lower isolator, and the ring is fabricated from a rigid material.

14. The isolating assembly defined in claim 13, wherein the connector is a polarizing connector that permits the lower isolator to move back-and-forth in a first direction and in a direction opposite to the first direction but does not permit the lower isolator to move back and forth in a second direction and in a direction opposite to the second direction; where the first direction and second direction are at right angles to each other.

15. An isolating assembly for use with a piece of equipment or a structure that vibrates or is sensitive to vibrations, said isolating assembly comprising:
   a lower isolator adapted to rest upon a flat surface;
   an upper isolator adapted to be engaged with the piece of equipment or the structure;
   a connector having first and second ends; wherein the first end engages the lower isolator and the second end engages the upper isolator; and upper isolator is positioned above the lower isolator; and
   a shell defining a cavity therein; and wherein the upper isolator is received within the cavity; and a pin extends outwardly from an inner surface of the shell and into the upper isolator.

16. The isolating assembly defined in claim 15, wherein the connector is a polarizing connector that permits the upper isolator to move back-and-forth in a first direction and in a direction opposite to the first direction but does not permit the upper isolator to move back and forth in a second direction and in a direction opposite to the second direction; where the first direction and second direction are at right angles to each other.

17. An isolating assembly for use with a piece of equipment or a structure that vibrates or is sensitive to vibrations, said isolating assembly comprising:
   a lower isolator adapted to rest upon a flat surface;
   an upper isolator adapted to be engaged with the piece of equipment or the structure;
   a connector having first and second ends; wherein the first end engages the lower isolator and the second end engages the upper isolator; and upper isolator is positioned above the lower isolator; and
   a shell having a circumferential side wall and a top wall extending across an upper end of the side wall; and wherein the top wall of the shell defines an aperture therein; and wherein a region of the upper isolator extend through the aperture in the top wall; and the upper isolator is securable to the shell.

18. The isolating assembly defined in claim 17, wherein the connector is a polarizing connector that permits the lower isolator to move back-and-forth in a first direction and in a direction opposite to the first direction but does not permit the lower isolator to move back and forth in a second direction and in a direction opposite to the second direction; where the first direction and second direction are at right angles to each other.

19. A system for dampening vibration in a piece of equipment or a structure; said system comprising:
   a plurality of individual isolating assemblies, each isolating assembly being adapted to engage the piece of equipment or the structure; and wherein each isolating assembly comprises:
   a lower isolator;
   an upper isolator; and
   a connector having first and second ends; wherein the first end engages the lower isolator and the second end engages the upper isolator; and wherein upper isolator is positioned above the lower isolator and is movable relative to the lower isolator; wherein each isolating assembly includes a shell that surrounds at least a portion of the upper isolator.

20. The system as defined in claim 19, wherein the shell includes a direction indicator on an exterior surface thereof; and wherein the isolating assemblies are polarizing assemblies where movement of the upper isolators therein is restricted in one direction; and wherein the direction indicators of all of the isolating assemblies are aligned with each other when the isolating assemblies are positioned to engage the piece of equipment or the structure.

21. A method of dampening vibration in a piece of equipment or a support structure for the piece of equipment, said method comprising; providing an isolator system that is positionable between a bottom wall of the piece of equipment or the structure and a flat surface; wherein the isolator system comprises a plurality of individual isolating assemblies, each isolating assembly being adapted to engage the piece of equipment or the structure; and wherein each isolating assembly comprises a lower isolator; an upper isolator; and a connector having first and second ends; wherein the first end engages the lower isolator and the second end engages the upper isolator; and wherein upper isolator is positioned above the lower isolator and is movable relative to the lower isolator; wherein each isolating assembly includes a shell that surrounds at least a portion of the upper isolator;
   engaging the upper isolator with the bottom wall of the piece of equipment or the structure;
   placing the lower isolator on the flat surface; and retaining the piece of equipment or the structure a distance above the flat surface.

22. The method as defined in claim 21, wherein the step of providing the isolator system includes providing polarizing connectors in each isolating assembly; and the method further includes:
   polarizing movement of the upper isolator relative to the lower isolator using in each isolating assembly using the polarizing connectors.

23. The method as defined in claim 21, wherein the step of providing the isolator system includes providing the plurality of isolating assemblies wherein the upper isolator and lower isolator therein are fabricated from a resilient material and the connector therein is fabricated from a rigid material; and wherein the method further includes;
   at least partially dampening vibration from the piece of equipment or from the structure with the material of one or both of the upper and lower isolating assemblies; and
   transferring vibration from the upper isolator to the lower isolator through the connector.

24. The method as defined in claim 21, further comprising:
   inserting a fastener extending upwardly from an upper end of the upper isolator of each one of the isolating assemblies into one of a plurality of recesses in the bottom wall of the piece of equipment or the structure.

25. The method as defined in claim 24, further comprising:
   engaging threads on a shaft of each fastener with threads provided in an associated one of the plurality of recesses in the bottom wall of the piece of equipment; or the structure; and
   rotating an associated isolating assembly about an axis that extends along the shaft in a first direction; and
   threadably engaging the threads on the shaft with the threads in the associated one of the plurality of recesses.

26. The method as defined in claim 25, further comprising:
   inserting an upper end of each of the plurality of isolating assemblies into one of a plurality of apertures defined in the bottom wall of the piece of equipment or the structure.

* * * * *